(12) United States Patent
Wu et al.

(10) Patent No.: US 6,650,801 B1
(45) Date of Patent: Nov. 18, 2003

(54) REVERSIBLE OPTICAL CIRCULATOR UTILIZING A BI-MORPHIC PIEZOELECTRIC APPARATUS

(75) Inventors: Shudong Wu, Fremont, CA (US); Simon X. F. Cao, San Mateo, CA (US); Thomas Cooney, Milpitas, CA (US); Weicheng Chen, State College, PA (US)

(73) Assignee: Avanex Corporation, Fremont, CA (US)

( * ) Notice: Subject to any disclaimer, the term of this patent is extended or adjusted under 35 U.S.C. 154(b) by 0 days.

(21) Appl. No.: 10/222,716

(22) Filed: Aug. 15, 2002

Related U.S. Application Data

(62) Division of application No. 09/513,777, filed on Feb. 24, 2000, now Pat. No. 6,463,189.

(51) Int. Cl.[7] .............................. G02B 6/26; G02B 6/42
(52) U.S. Cl. .............................. 385/16; 385/11; 385/18; 385/19; 359/494; 359/495
(58) Field of Search .............................. 385/11, 16, 18, 385/19; 359/494, 495, 501

(56) References Cited

U.S. PATENT DOCUMENTS

| | | | |
|---|---|---|---|
| 3,544,201 A | * 12/1970 | Fowler | 310/332 |
| 4,303,302 A | * 12/1981 | Ramsey | 385/23 |
| 4,410,238 A | 10/1983 | Hanson | 350/347 |
| 4,478,494 A | 10/1984 | Soref | 350/381 |
| 4,651,343 A | 3/1987 | Laor | 455/600 |
| 4,961,620 A | 10/1990 | Uken et al. | 350/96.15 |
| 4,969,720 A | 11/1990 | Lins et al. | 350/381 |
| 5,028,104 A | 7/1991 | Kokoshvili | 350/91.15 |
| 5,268,974 A | * 12/1993 | Hikita et al. | 385/19 |
| 5,343,541 A | 8/1994 | Uken et al. | 385/16 |
| 5,414,541 A | 5/1995 | Patel et al. | 359/39 |
| 5,594,820 A | 1/1997 | Garel-Jones et al. | 385/22 |
| 5,602,955 A | 2/1997 | Haake | 385/136 |
| 5,606,439 A | 2/1997 | Wu | 349/117 |
| 5,694,233 A | 12/1997 | Wu et al. | 359/117 |
| 5,724,165 A | * 3/1998 | Wu | 359/117 |
| 5,742,712 A | 4/1998 | Pan et al. | 385/18 |
| 5,838,847 A | 11/1998 | Pan et al. | 385/18 |
| 5,867,291 A | 2/1999 | Wu et al. | 359/124 |
| 5,867,617 A | 2/1999 | Pan et al. | 385/18 |
| 5,909,301 A | * 6/1999 | Laughlin | 385/16 |
| 5,912,748 A | 6/1999 | Wu et al. | 359/117 |
| 5,943,454 A | 8/1999 | Aksyuk et al. | 385/22 |
| 6,263,131 B1 | * 7/2001 | Frisken | 385/11 |

\* cited by examiner

Primary Examiner—Drew A. Dunn
Assistant Examiner—Leo Boutsikaris
(74) Attorney, Agent, or Firm—Sawyer Law Group LLP

(57) ABSTRACT

A reversible optical circulator has an optical switch that includes: an arm composed of piezoelectric material with first and second faces and first and second ends, an electrode coupled to the arm for providing a voltage difference between the first and second faces of the arm, a support coupled to the first end of the arm for fixedly supporting the first end, an object with a convex surface coupled to the second end of the arm, a polarization rotation element coupled to the second face of the arm, a first magnet proximately located to the object and the first face of the arm, and a second magnet proximately located to the object and the second face of the arm. By using this optical switch, the optical circulator has stable and reproducible operation, high switching speeds, and low sensitivity to slight optical mis-alignments.

15 Claims, 26 Drawing Sheets

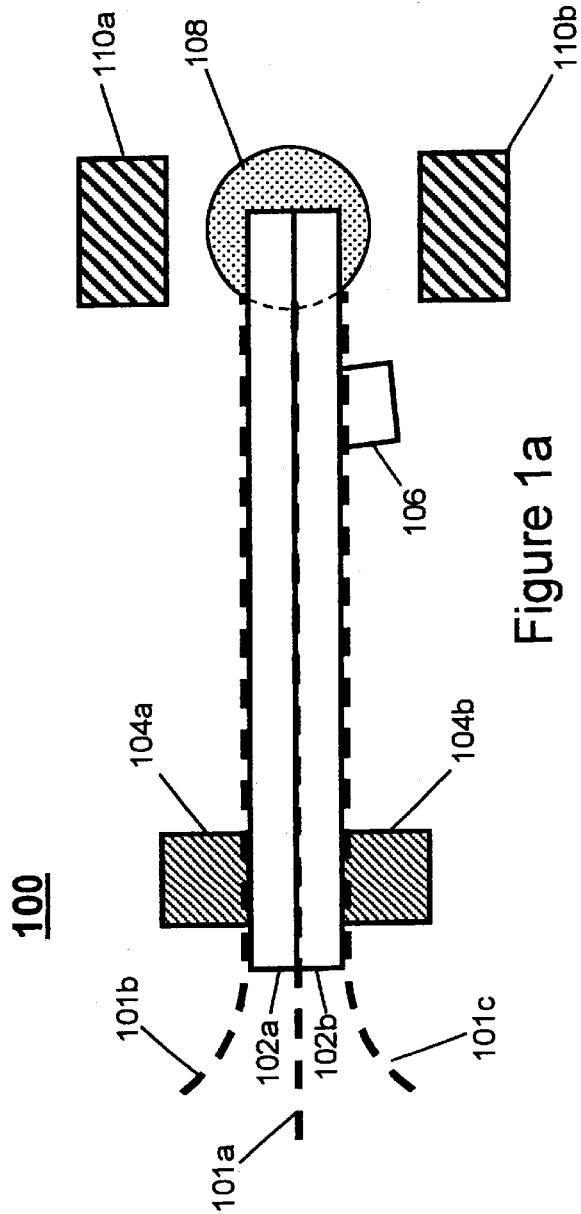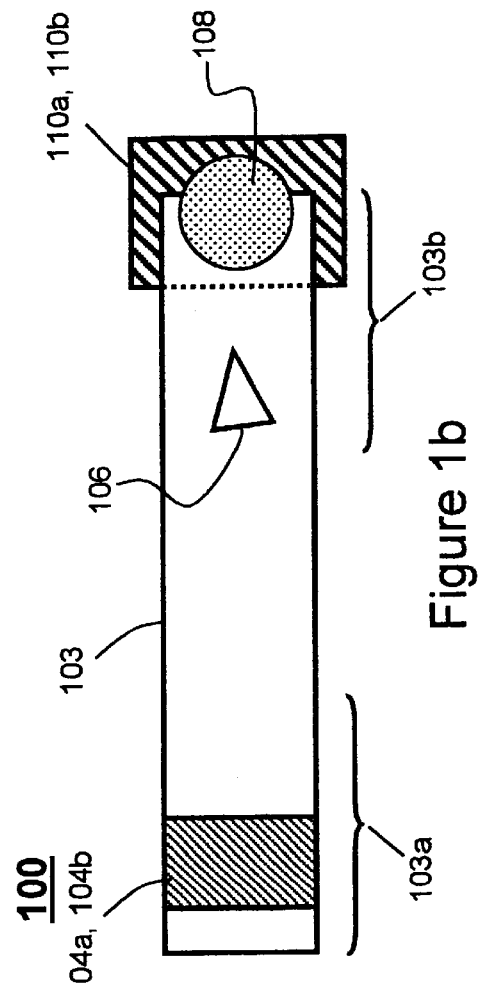

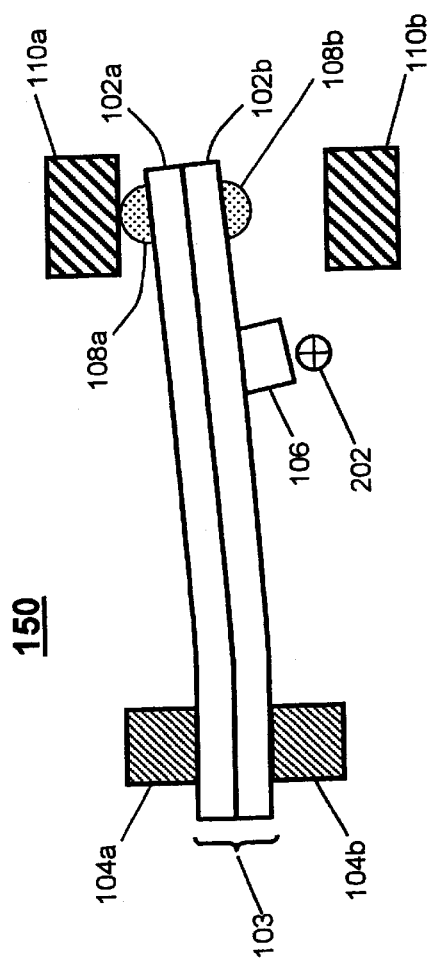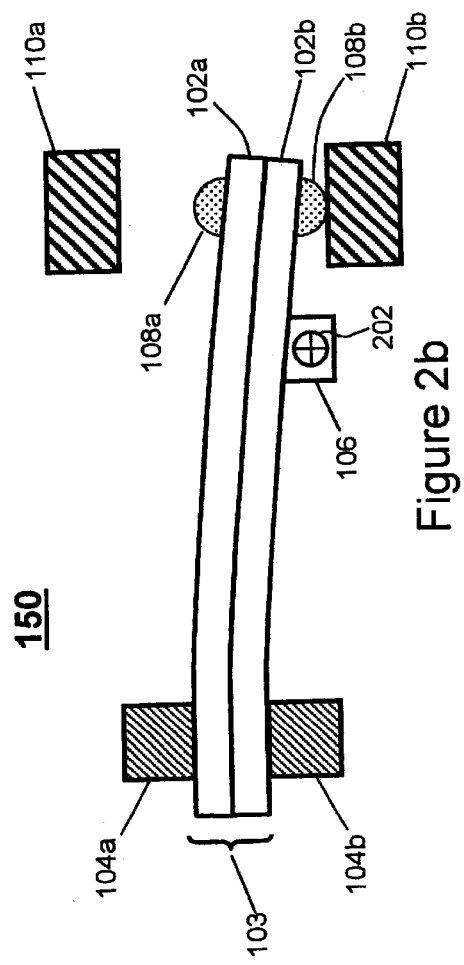

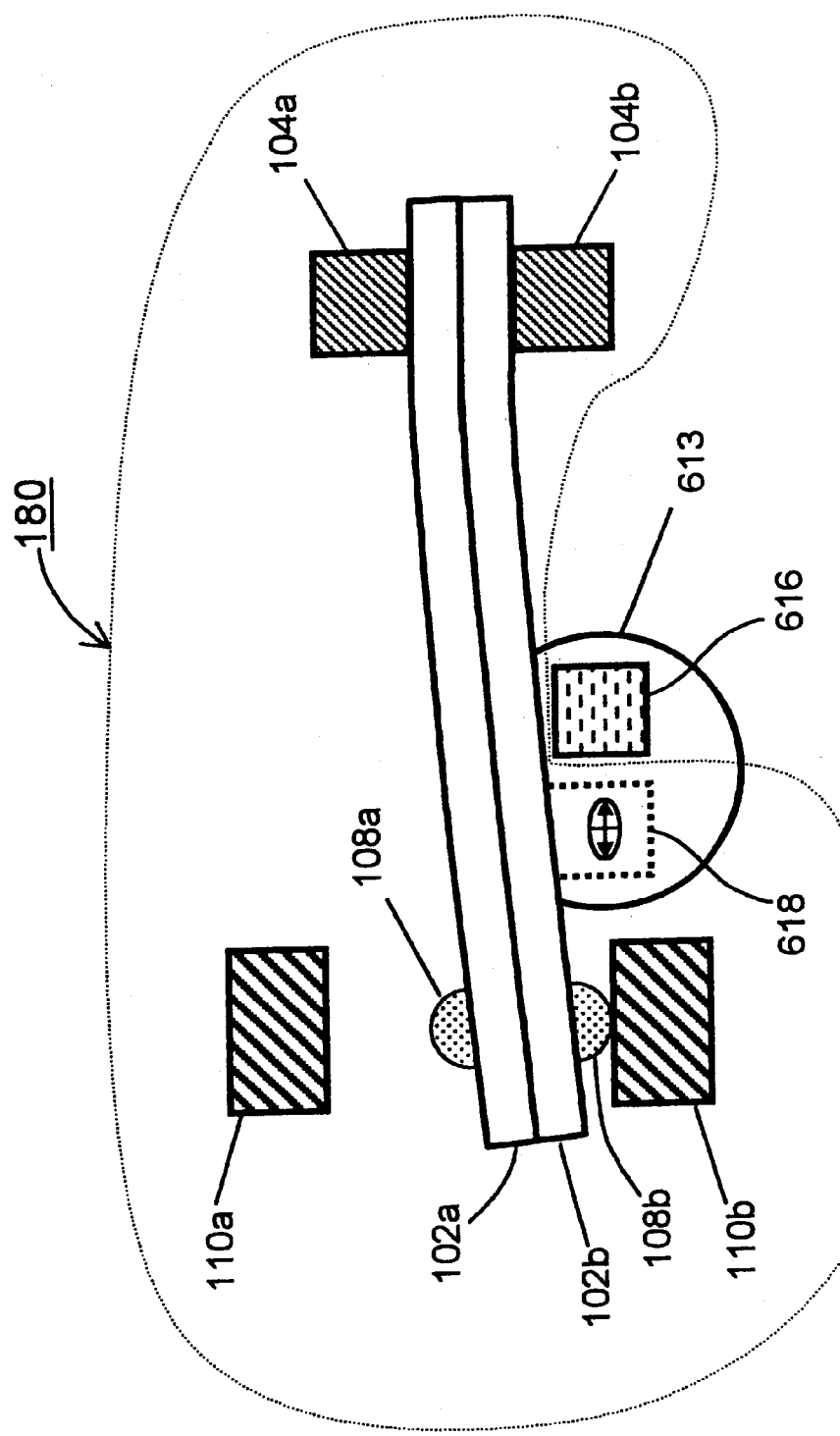

REVERSIBLE OPTICAL CIRCULATOR UTILIZING A BI-MORPHIC PIEZOELECTRIC APPARATUS

CROSS-REFERENCE TO RELATED APPLICATIONS

This application is a DIVISIONAL of U.S. Patent Application titled, "Method And Apparatus For Optical Switching Devices Utilizing A Bi-Morphic Piezoelectric Apparatus", Ser. No. 09/513,777, filed on Feb. 24, 2000 now U.S. Pat. No. 6,463,189.

FIELD OF THE INVENTION

The present invention relates to optical devices, and more particularly to optical switching and routing devices.

BACKGROUND OF THE INVENTION

The use of optical fiber for long-distance transmission of voice and/or data is now common. As the demand for data carrying capacity continues to increase, there is a continuing need to utilize the bandwidth of existing fiber-optic cable more efficiently. An established method for increasing the carrying capacity of existing fiber cable is Wavelength Division Multiplexing (WDM) in which multiple information channels are independently transmitted over the same fiber using multiple wavelengths of light. In this practice, each light-wave-propagated information channel corresponds to light within a specific wavelength range or "band."

Because of the increased network traffic resulting from the use of the WDM technique, there is an increasing need for sophisticated optical switching and routing devices which can quickly route numerous channels among various optical communications lines and which can reliably divert network traffic to alternative routes in the event of network failures. Routine network traffic routing requires optical switching devices that can perform reproducibly over many thousands of switching operations. Network failure restoration requires a switching device that must instantaneously perform according to specification after long periods of non-use. The present invention addresses these needs.

SUMMARY OF THE INVENTION

A reversible optical circulator has an optical switch that includes: an arm composed of piezoelectric material with first and second faces and first and second ends, an electrode coupled to the arm for providing a voltage difference between the first and second faces of the arm, a support coupled to the first end of the arm for fixedly supporting the first end, an object with a convex surface coupled to the second end of the arm, a polarization rotation element coupled to the second face of the arm, a first magnet proximately located to the object and the first face of the arm, and a second magnet proximately located to the object and the second face of the arm. By using this optical switch, the optical circulator has stable and reproducible operation, high switching speeds, and low sensitivity to slight optical mis-alignments.

BRIEF DESCRIPTION OF THE DRAWINGS

FIGS. 1a and 1b are side and top views, respectively, of a first preferred embodiment of a bimorphic piezoelectric deflection and latching apparatus in accordance with the present invention.

FIGS. 2a and 2b are side views of the two stable operating positions of the second preferred embodiment of the bimorphic piezoelectric optical switch in accordance with the present invention.

FIGS. 6a, 6b and 6c are, respectively, a side view, a top view and an end view of a preferred embodiment of a reversible circulator in accordance the present invention.

DETAILED DESCRIPTION OF THE INVENTION

Figure 1C:
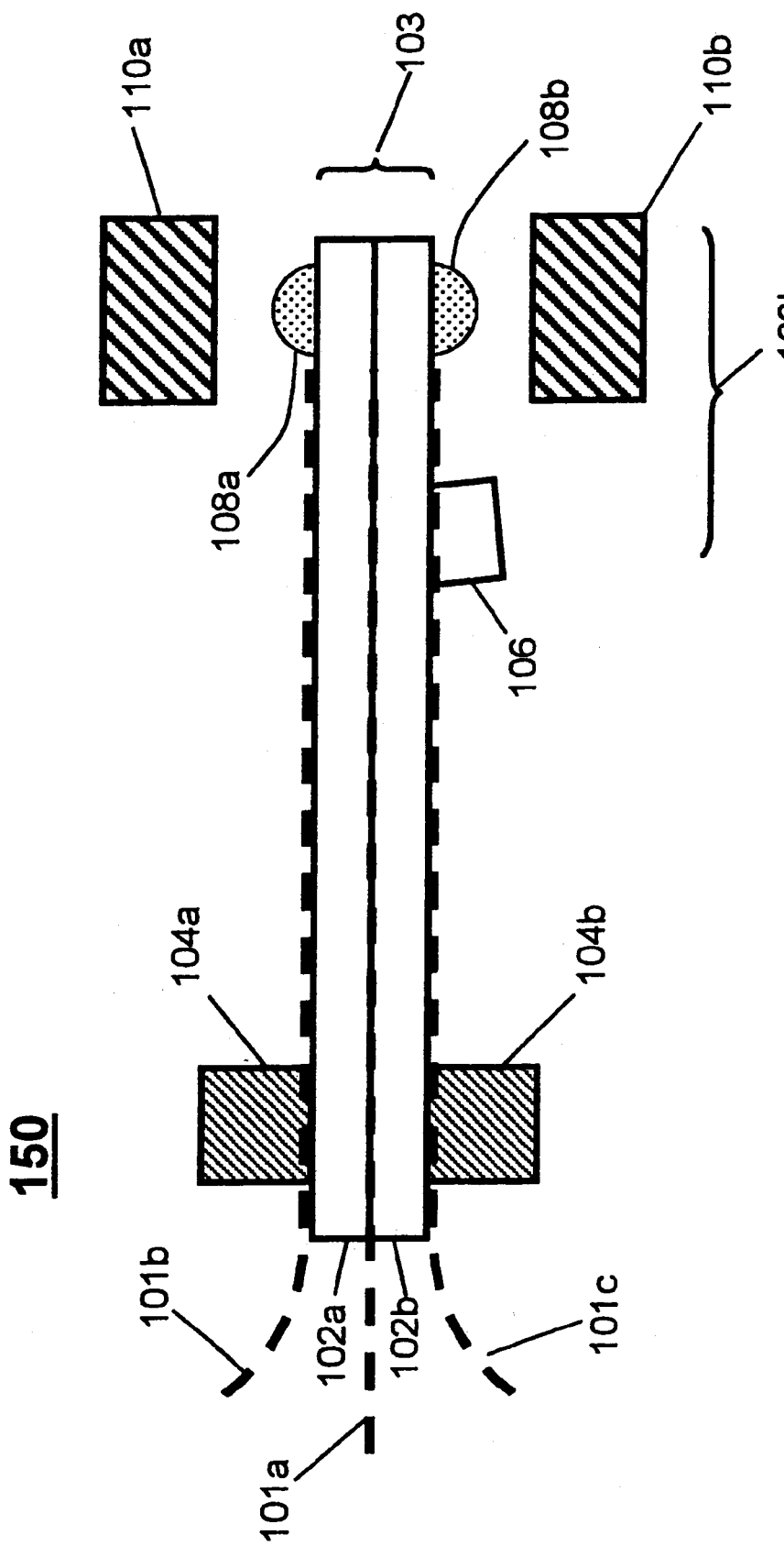
FIG. 1c illustrates a second preferred embodiment of a bimorphic piezoelectric deflection and latching apparatus in accordance with the present invention.

The present invention provides method and apparatus for optical switching devices utilizing a bi-morphic piezoelectric apparatus. The following description is presented to enable one of ordinary skill in the art to make and use the invention and is provided in the context of a patent application and its requirements. Various modifications to the preferred embodiment will be readily apparent to those skilled in the art and the generic principles herein may be applied to other embodiments. Thus, the present invention is not intended to be limited to the embodiment shown but is to be accorded the widest scope consistent with the principles and features described herein.

To more particularly describe the features of the present invention, please refer to FIGS. 1 through 18 in conjunction with the discussion below.

FIGS. 1a and 1b are side and top views, respectively, of a first preferred embodiment 100 of a bimorphic piezoelectric deflection and latching apparatus in accordance with the present invention. The apparatus 100 comprises two elongate plates 102a–102b comprised of a piezoelectric material such as quartz and securely bonded in parallel to one another and mounted in support members 104a and 104b. A first electrode 101a is disposed between the piezoelectric plates 102a–102b along their bonded faces. Also, a second 101b and a third 101c electrode is disposed along the side of the first 102a and the second 102b plate opposite to its bonded face. When so bonded and mounted, the pair of piezoelectric plates 102a–102b comprise a single cantilever arm 103 comprised of a first end 103a, which is rigidly physically supported by support elements 104a–104b, and a second opposing "free" end 103b which is not permanently physically mounted. Disposed to either side of the free end 103b of cantilever arm 103 are a first 110a and second 110b permanent magnet. Also, a solid object with a rounded convex surface 108, such as a metallic sphere or spheroid, is mounted at the free end 103b of cantilever arm 103. The metallic sphere or spheroid 108 is comprised of a material such as iron, steel, or nickel that experiences a magnetic force of attraction towards either permanent magnet 110a or 110b. Finally, an optical element 106, such as a glass prism, is mounted to cantilever arm 103 along a free length of the arm 103 near the metallic sphere 108.

FIG. 1c illustrates a second preferred embodiment 150 of the bimorphic piezoelectric deflection and latching apparatus in accordance with the present invention. In the apparatus 150, the single sphere 108 is replaced by a pair of opposing hemispheres 108a–108b, where the first metallic hemisphere 108a is mounted on the first plate 102a at the free end 103b of arm 103 so as to face the first magnet 110a, and the second metallic hemisphere 108b is mounted on the second plate 102b at the free end 103b of arm 103 so as to face the second magnet 110b. The operation of apparatus 150 is not significantly different from that of apparatus 100 described above.

When at rest precisely between the two magnets 110a–110b, as shown in FIG. 1a, the free end 103b of cantilever arm 103 is in a hypothetical metastable physical state since the upward force of attraction between sphere or spheroid 108 and the first magnet 110a exactly balances the downward force of attraction between sphere or spheroid 108 and the second magnet 110b. However, such an intermediate metastable state cannot physically exist for any finite period of time because slight perturbations of the position of the arm 103 will create situations in which the upward and downward magnetic forces are unbalanced and where the free end 103b of arm 103 will either be pulled upward until sphere/spheroid 108 comes into contact with the first magnet 110a or else will be pulled downward until sphere/spheroid 108 comes into contact with the second magnet 110b. These two alternative positions comprise a pair of stable, "latched" positions.

In operation, differential voltages are placed across the faces of the two bonded piezoelectric plates 102a–102b via the electrode 101a–101c such that the resulting differential piezoelectric expansion and/or contraction causes flexure of the cantilever arm 103. Electrode 101b maintains a constant voltage and electrode 101c is electrically grounded. A variable signal voltage is applied to the central electrode 101a so as to create the differential voltages across the two piezoelectric plates 102a–102b. The direction of flexure for cantilever arm 103 is controlled by the magnitude of the signal voltage on electrode 101a and can be either upward or downward. Because support members 104a–104b rigidly support the first end 103a of cantilever arm 103, all such flexure is taken up by the second end 103b of arm 103 disposed between magnets 110a–110b. By this means, it is possible to achieve precise, rapid and reproducible bi-stable control of the deflection of the second end 103b of cantilever arm 103, and, more particularly, of the position of the prism 106. As shown in FIG. 2a, when apparatus 150 is in the upward latched position or "off" state, prism 106 does not intercept an optical signal 202. However, as shown in FIG. 2b, when apparatus 150 is in the downward latched position or "on" state, prism 106 is disposed so as to intercept, and thereby deflect, the optical signal 202.

Figure 3B:
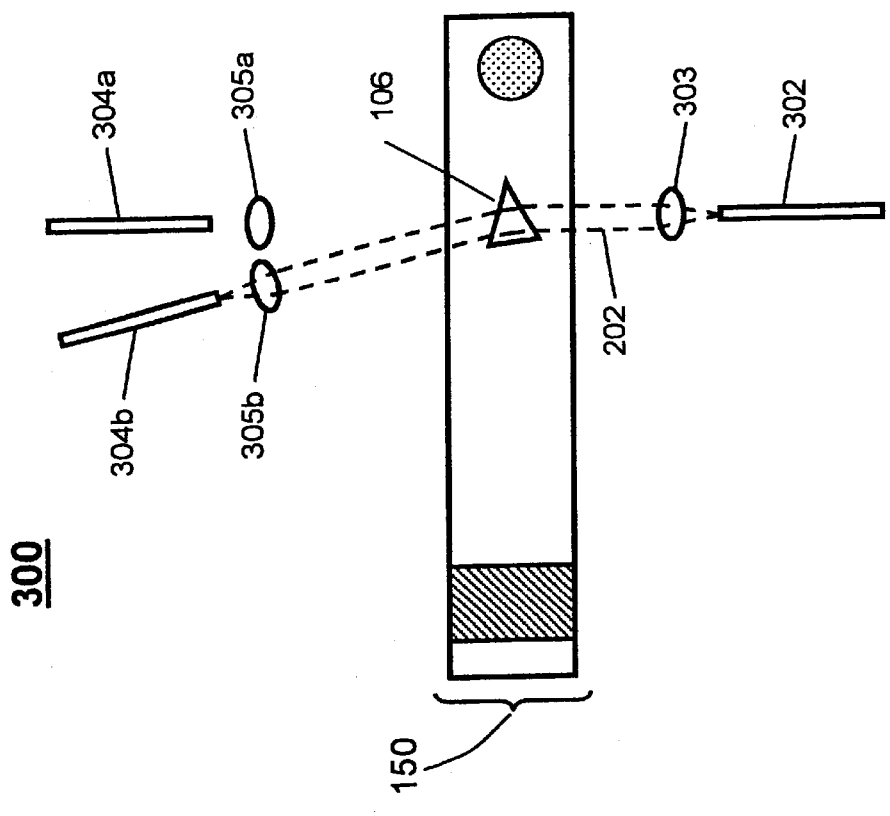
FIGS. 3a and 3b illustrate a first preferred embodiment of an optical switch in accordance with the present invention.
Figure 3A:
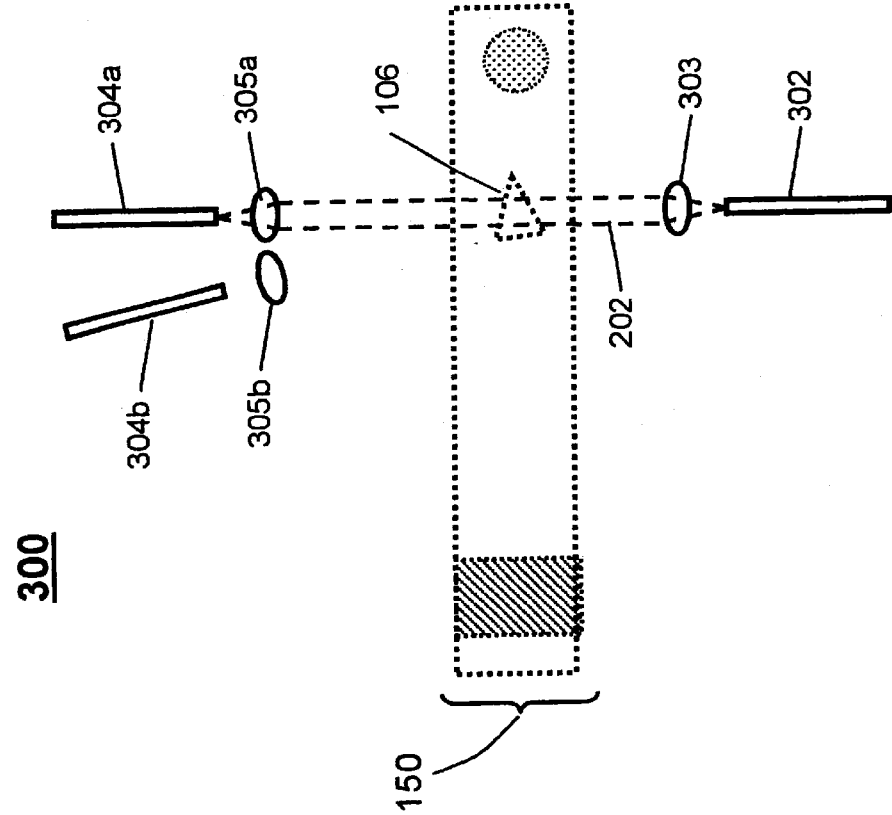

FIGS. 3a and 3b illustrate a first preferred embodiment of an optical switch which utilizes the deflection and latching apparatus in accordance with the present invention. This optical switch 300 is a 1×2 optical switch. FIG. 3a illustrates the "off" switch position in which apparatus 150 is latched in its upward state such that prism 106 does not intercept signal light pathways. Conversely, FIG. 3b illustrates the "on" switch position in which apparatus 150 is latched in its downward state such that prism 106 intercepts signal light pathways. In both FIG. 3a and FIG. 3b, an optical signal or composite optical signal 202 emanates from an input fiber 302 and is collimated by a collimating lens 303 so that the resulting collimated light beam crosses the "on" position of prism 106. As shown in FIG. 3a, with the switch 300 in the "off" state, the optical signal or composite optical signal 202 passes in a straight line past the position of apparatus 150 so as to be intercepted by focusing lens 305a and thereby focused into first output fiber 304a. However, with the switch 300 latched in the "on" state, as shown in FIG. 3b, the signal or composite signal 202 intercepts the prism 106 and is thereby deflected from a straight line path. The deflection is such that the signal or composite signal 202 is intercepted by focusing lens 305b and thereby focused into second output fiber 304b.

Figure 3C:
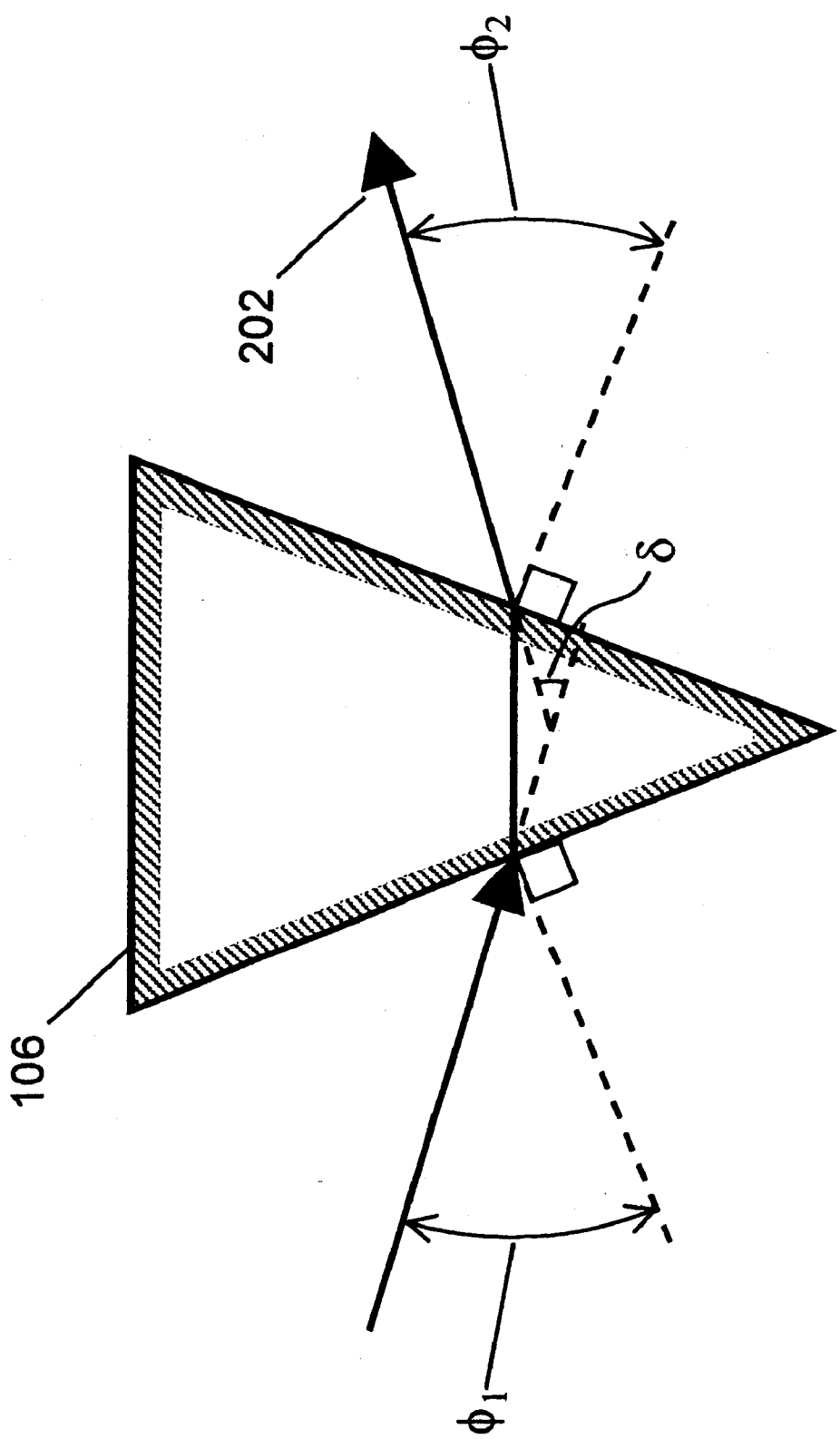
FIG. 3c is a diagram of the optical pathway of a signal or composite signal through the glass prism in accordance with the present invention.

FIG. 3c is a diagram of the optical pathway of a signal or composite signal 202 through the glass prism 106 of the optical switch 300 in accordance with the present invention. The angle $\phi_1$ is the angle of incidence, with respect to the surface normal to the entrance face of prism 106, of signal 202 upon the prism 106 and the angle $\phi_2$ is the exit angle, with respect to the surface normal to the exit face of prism 106, of signal 202 upon leaving the prism 106.

Figure 3D:
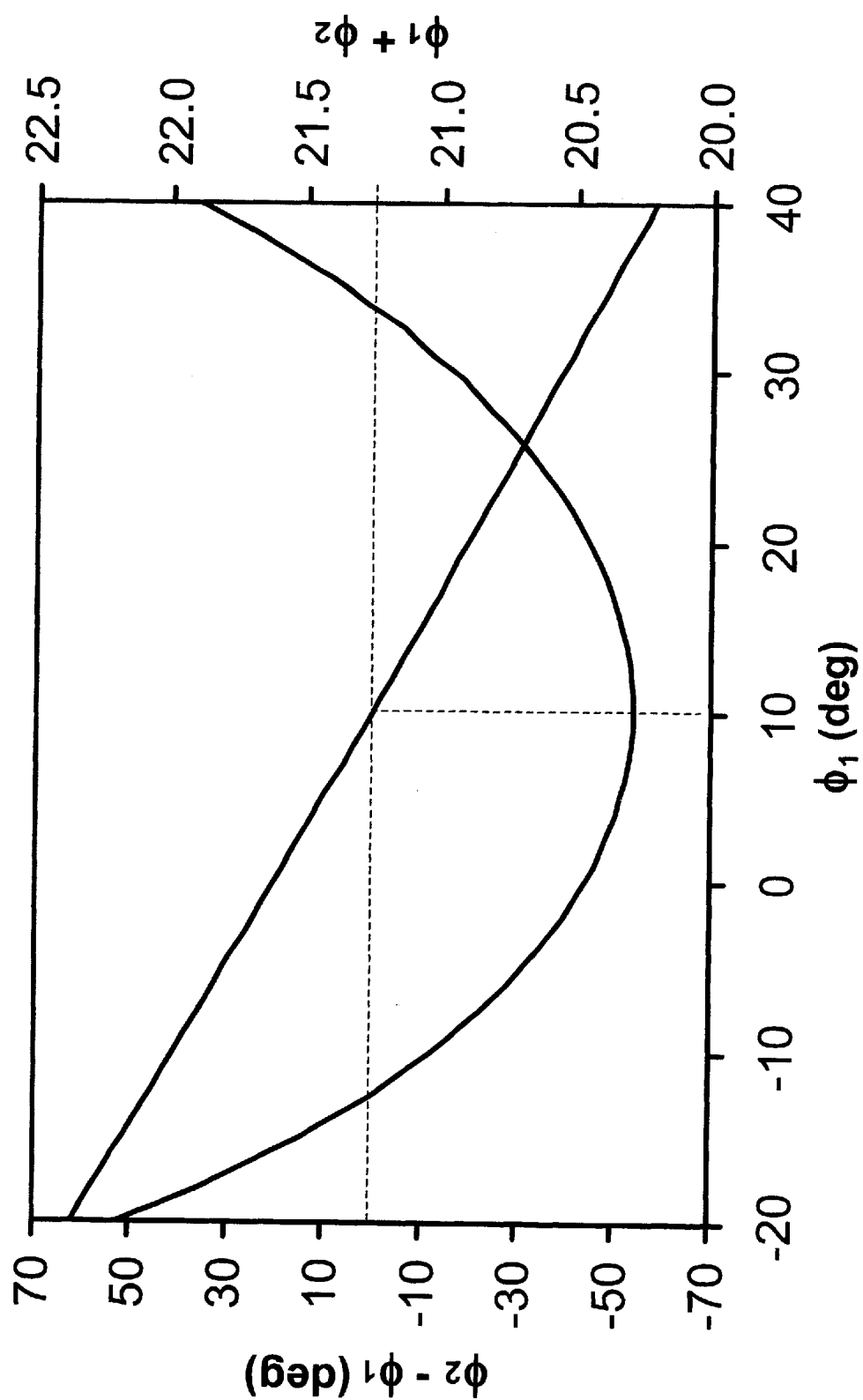
FIG. 3d is a graph of total deflection and difference between incidence and exit angles through the glass prism of the optical switch in accordance with the present invention.

For maximum stability of the output ray path against slight angular mis-alignments or vibrations, the angle $\delta$ between the projections of the incoming and outgoing segments of signal 202 must vary as little as possible with the angle of incidence $\phi_1$. This condition is true when $\delta$ is at a minimum value and, consequently, when the sum $\phi_1+\phi_2$ is at a minimum value. Simple geometric analysis shows that this condition is true when the angle of incidence $\phi_1$ is chosen such that $\phi_1=\phi_2$. FIG. 3d is a graph of $\delta$ and $\phi_2-\phi_1$ versus $\phi_1$ showing that, for a typical prism, the minimum in $\delta$ occurs when the incidence and exit angles are identical. The stability and reproducibility of the preferred embodiment is greatest with such a configuration.

Figure 4A:
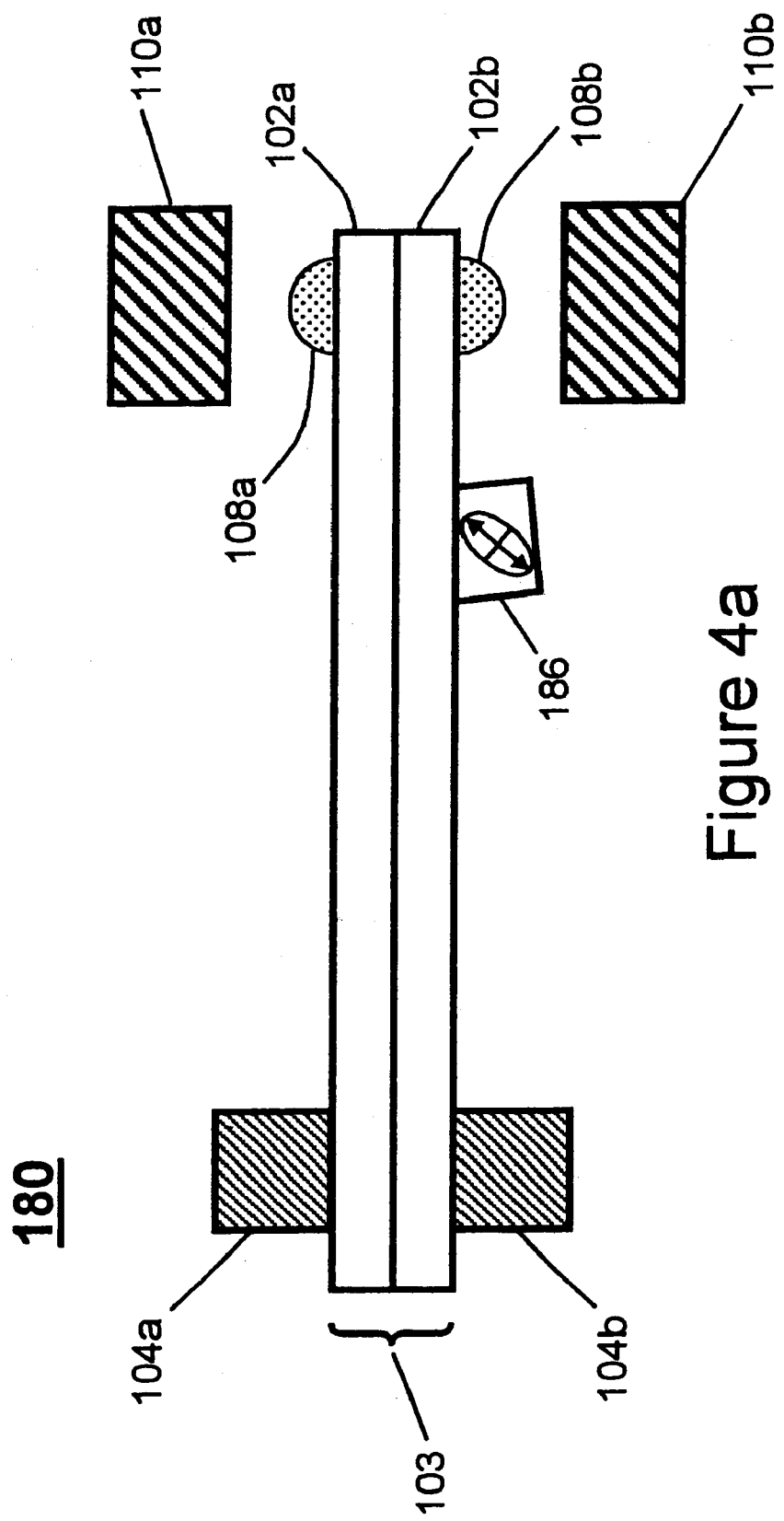
FIG. 4a illustrates a second preferred embodiment of an optical switch in accordance with the present invention.

FIG. 4a illustrates a second preferred embodiment of an optical switch in accordance with the present invention. The second preferred embodiment is a differential phase retardance switch 180 which is based upon the bimorphic piezoelectric deflection and latching apparatus 150, described above. In the switch 180, instead of a prism, an optical half-wave plate 186 is mounted to the arm 103. When the switch 180 is in its "off" position, the half-wave plate 186 is not in the path of an optical signal or beam. When the switch 180 is in its "on" position, however, the half-wave plate 186 is disposed so as to intercept the path of an optical signal or beam and to be in a particular optical orientation. Other aspects of the operation of the switch 180 are similar to those of apparatus 150. The differential phase retardance switch 180 may be utilized in complex switching devices as subsequently described herein in more detail.

Figure 4C:
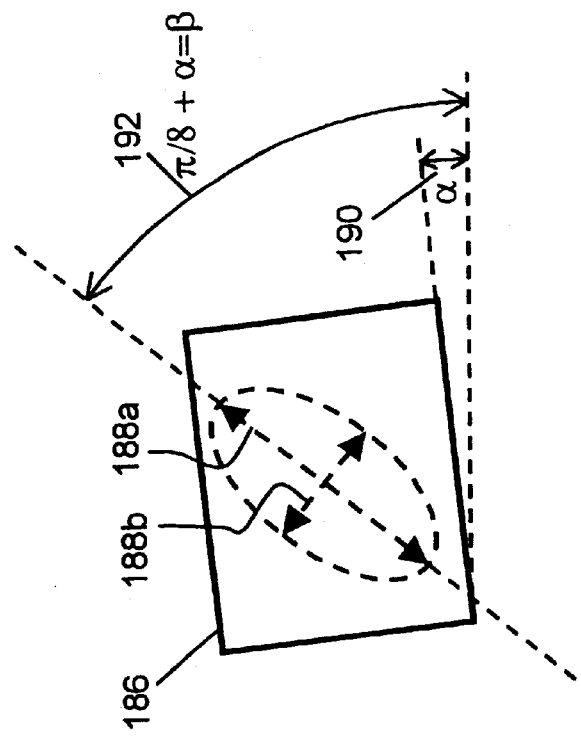
FIGS. 4b and 4c illustrate two alternative dispositions of the optically slow direction and optically fast direction of a half-wave plate in the differential phase retardance switch in accordance with the present invention.
Figure 4B:
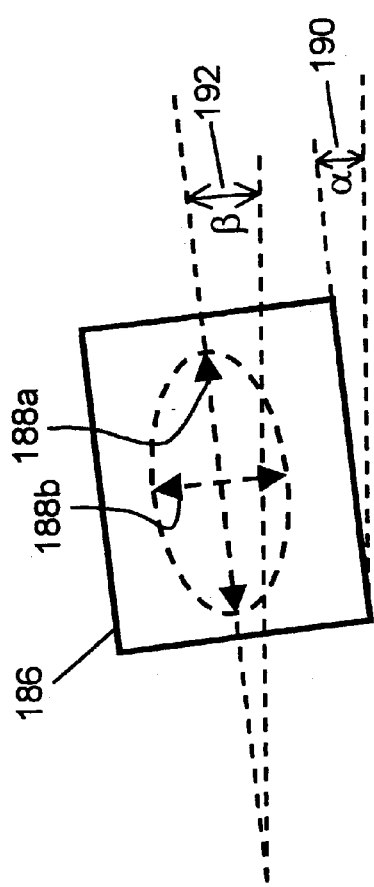

FIG. 4b and FIG. 4c illustrate two alternative dispositions of the optically slow direction 188a and optically fast direction 188b of half-wave plate 186 in the switch 180 in accordance with the present invention. The ellipses in FIGS. 4b and 4c are representations of the refractive indices experienced by plane polarized light passing through plate 186 with a variety of polarization plane orientations. The orientations of direction 188a and direction 188b may be interchanged—that is plate 186 may be rotated by 90°—in the configuration of either FIG. 4b or FIG. 4c without changing the operation of the differential phase retardance switch 180. In FIGS. 4b and 4c, the angle α 190 represents the rotation angle that the plate 186 undergoes during rotation of the switch 180 from its latched "off" to its latched "on" position. The orientation of either the fast direction 188b or the slow direction 188a of half-wave plate 186 makes an angle β 192 with the horizontal when apparatus 180 is in the "off" position. In the preferred configuration illustrated in FIGS. 4b–4c, the angle 190 comprises the angle between the base of plate 186 and the horizontal, but this need not be the case.

The configuration illustrated in FIG. 4b is such that the slow and fast directions of half-wave plate 186 are disposed horizontal and vertical, or vice versa, when switch 180 is in its "on" position and half-wave plate 186 is disposed so as to intercept an optical path. The configuration illustrated in FIG. 4b is suitable for rotating the polarization plane of plane polarized light from a first to a second orientation where the first and second orientations are both at 45° to the horizontal or vertical. The configuration illustrated in FIG. 4c is such that the slow and fast directions of half-wave plate 186 are disposed at 45° to the horizontal and vertical when the switch 180 is in its "on" position. The configuration illustrated in FIG. 4c is suitable for rotating the polarization plane of plane polarized light from horizontal to vertical or vice versa.

Figure 5B:
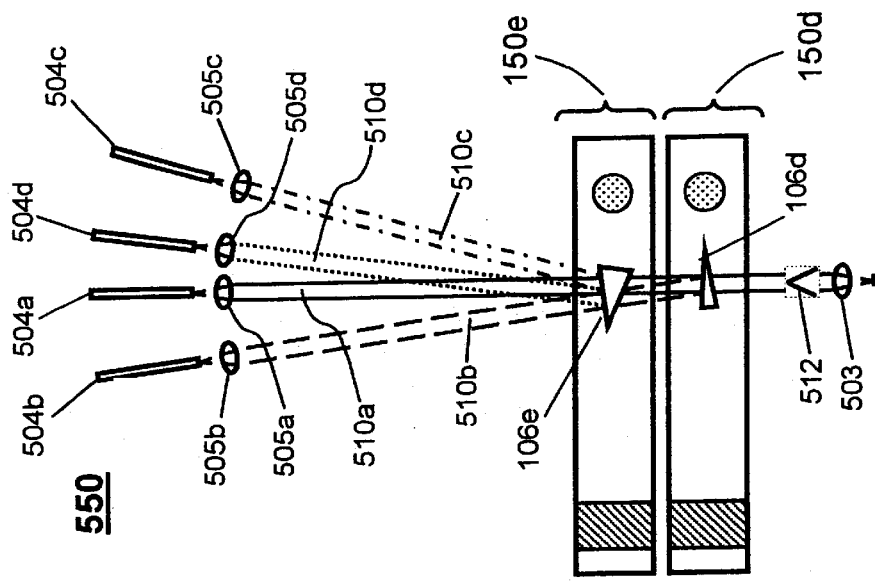
FIGS. 5a and 5b illustrate a third and a fourth preferred embodiment of an optical switch in accordance with the present invention.
Figure 5A:
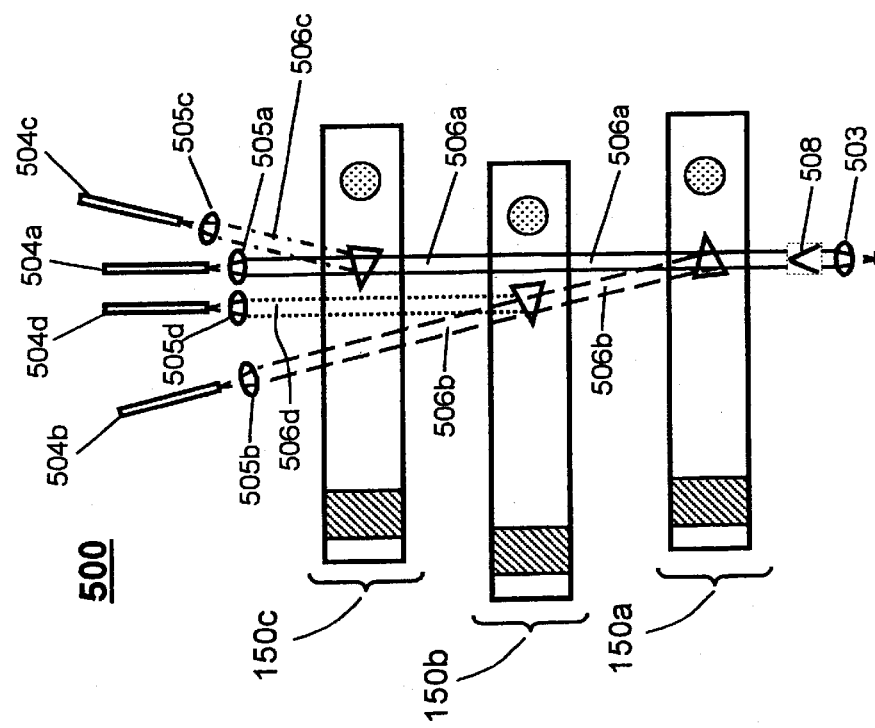

FIGS. 5a and 5b illustrate a third and a fourth preferred embodiment of optical switches in accordance with the present invention. These embodiments are 1×4 optical switches, each comprising a cascaded arrangement of a set of bimorphic piezoelectric apparatuses in accordance with the present invention. Both the parallel cascaded 1×4 optical switch 500 of FIG. 5a and the serial cascaded 1×4 optical switch 550 of FIG. 5b comprise a single input optical fiber 502 disposed adjacent to a collimating lens 503 and a set of four output optical fibers 504a–504d, each of which is disposed adjacent to its own focusing lens 505a–505d, respectively. It is to be kept in mind, however, that the illustrated optical pathways in either switch 500 or switch 550 may be reversed so as to comprise a 4×1 optical switch with four input fibers 504a–504d and a single output fiber 502. In switch 500 (FIG. 5a), three bimorphic piezoelectric deflection/latching apparatuses 150a–150c in accordance with the present invention are disposed adjacent to one another so that the optical signal or beam pathways 506a–506d cross the positions of the apparatuses 150a–150c in sequence and either pass by each apparatus in a straight line or are deflected depending upon whether the apparatus is in its "off" or "on" position, respectively. In switch 550 (FIG. 5b), two bimorphic piezoelectric deflection/latching apparatuses 150d–150e in accordance with the present invention are disposed similarly.

For instance, in FIG. 5a, an optical beam or signal 508 is output from fiber 502 and, after being collimated by lens 503, initially follows path segment 506a, which crosses the position of first deflection/latching apparatus 150a. Depending upon whether apparatus 150a is in the "off" or "on" state, signal 508 either passes the position of apparatus 150a undeflected, thereby remaining on path 506a, or else is deflected onto path 506b, respectively. The path 506a and the path 506b continue on so as to cross the positions of deflection/latching apparatuses 150c and 150b, respectively. If apparatus 150a is "off", then, depending upon whether apparatus 150c is in the "off" or "on" state, signal 508 either continues on along path 506a so as to be focused by lens 505a into fiber 504a or else is deflected onto path 506c so as to be focused by lens 505c into fiber 504c, respectively. Likewise, if apparatus 150a is "on", then, depending upon whether apparatus 150b is in the "off" or "on" state, signal 508 either continues on along path 506b so as to be focused by lens 505b into fiber 504b or else is deflected onto path 506d so as to be focused by lens 505d into fiber 504d, respectively. By this means, the apparatus 500 functions as a 1×4 optical switch.

In the 1×4 switch 550, only two deflection and latching apparatuses, 150d–150e are utilized. The prism 106e of apparatus 150e is larger and formed with a wider apex angle than that of the prism 106d of apparatus 150d. The apparatus 150d either passes optical signal 512 straight through along optical path 510a without deflection, or else deflects it onto path 510b depending upon the state of apparatus 100d. Both optical pathways 510a and 510b are subsequently intercepted by the prism 106e comprising deflection/latching apparatus 150e. Depending upon whether deflection/latching apparatus 150e is "off" or "on", it respectively either passes signal 512 straight through along one of the paths 504a or 504b without deflection, or else deflects signal 512 onto one of the paths 504c or 504d. The signal 512 is then focused by one of the lenses 505a–505d into one of the output fibers 504a–504d. By this means, the apparatus 550 functions as a 1×4 optical switch.

Either of the switch embodiments illustrated in FIGS. 5a and 5b may be expanded to a greater number of output ports by adding more deflection and latching apparatuses in accordance with the present invention in either the parallel cascade (FIG. 5a) or the serial cascade (FIG. 5b) arrangement. Moreover, the separate deflection and latching apparatuses comprising either the switch 500 or the switch 550 may be disposed to as to cause successive signal deflections about respective axes that are not parallel to one another. This latter arrangement produces a switch capable of directing signals to outputs disposed within three dimensions, thereby saving space and increasing usage flexibility. The switch 550 has the advantage over switch 500 of utilizing fewer components, thereby facilitating alignment and fabrication ease, and producing the advantage of compactness. However, the switch 500 has the potential advantage over switch 550 of not requiring ever-larger deflection prisms for the second and subsequent deflection/latching apparatuses of which it is comprised.

Figure 6A:
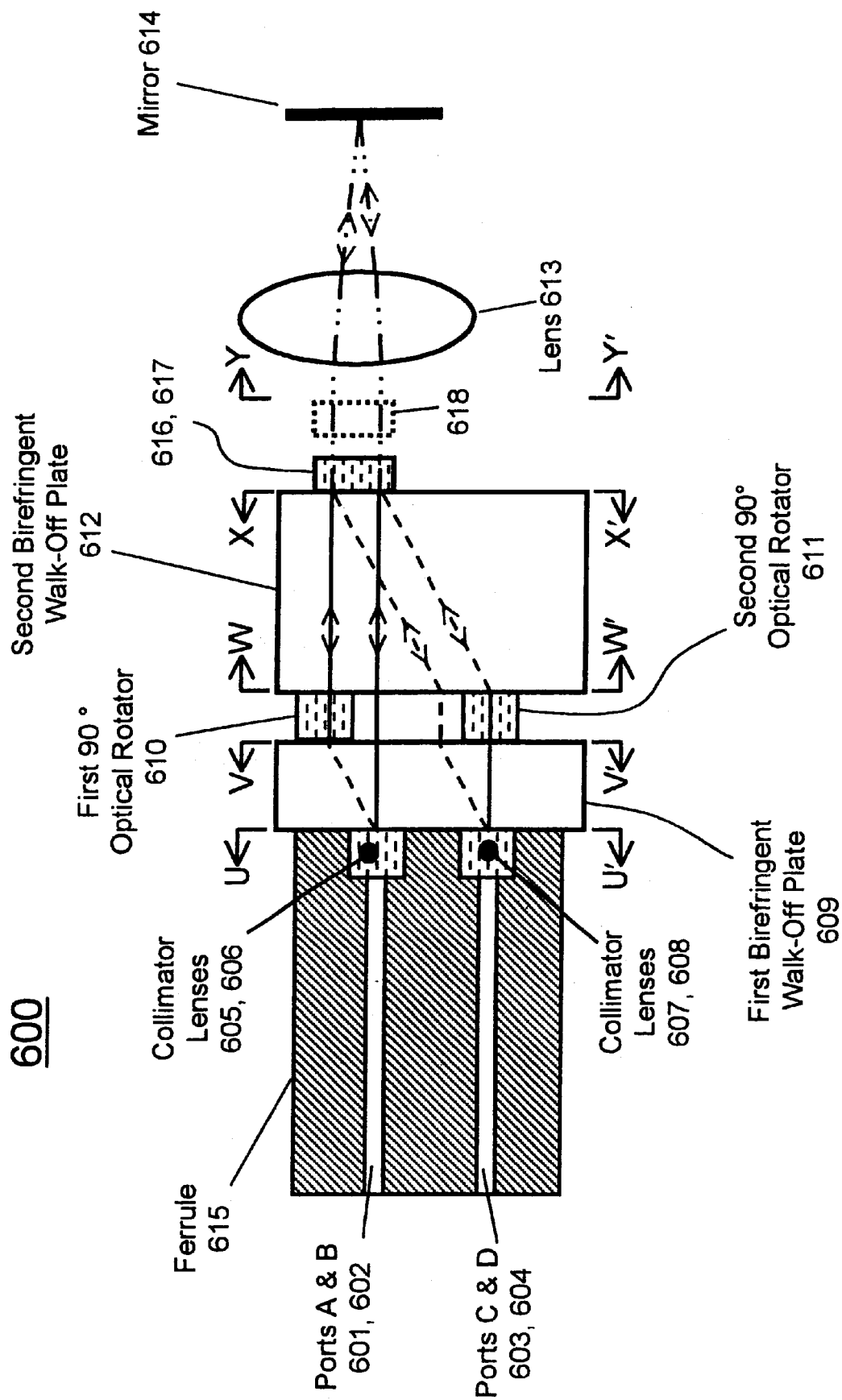
Figure 6B:
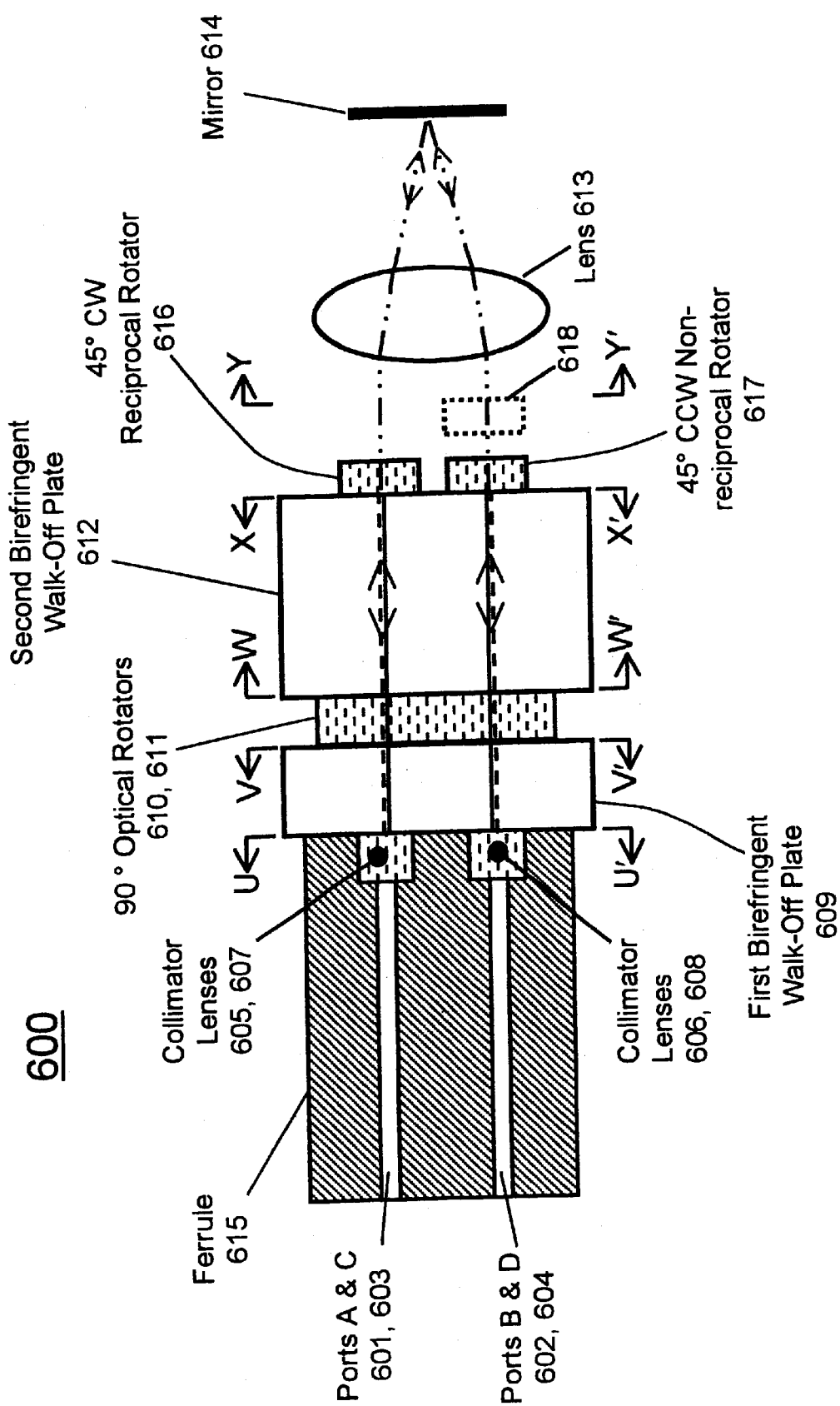

FIGS. 6a and 6b respectively show a side view and a top view of a preferred embodiment of a reversible optical circulator 600 which utilizes the differential phase retardance switch 180 in accordance with the present invention to switch optical circulation between logical "clockwise" and "counterclockwise" directions. In the reversible optical circulator 600 shown in FIGS. 6a and 6b, reference numeral 615 is a ferrule and reference numerals 601, 602, 603 and 604 are four optical ports contained within or secured by ferrule 615. Preferably, such optical ports comprise optical fibers although they may comprise any type or combination of types of optical inputting and outputting device, such as windows.

Figure 7:
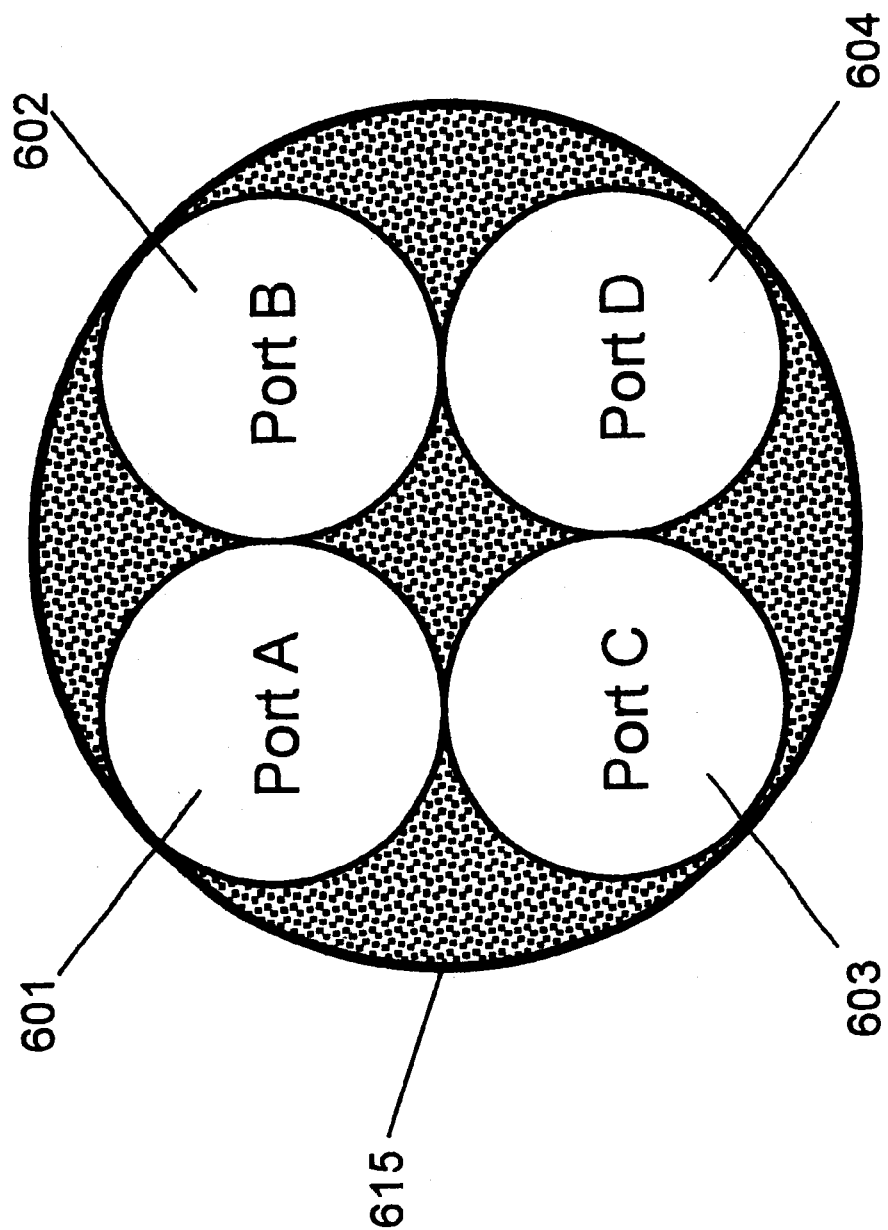
FIG. 7 is an end view of the port configuration of the input and output ports of the reversible circulator in accordance with the present invention.

FIG. 7 shows an end view of the configuration of the four ports—Port A 601, Port B 602, Port C 603 and Port D 604—as viewed from the left side of the device 600 of FIGS. 6a and 6b. As also shown in FIGS. 6a and 6b, four collimator lenses 605–608 are disposed at the end of ferrule 615 such that each collimator receives light from and directs light to exactly one of the ports, specifically Port 601, 602, 603 and 604, respectively. Collimated light rays emanating from any of these four ports 601–604 are parallel to one another and define the direction of the main axis of reversible circulator 600.

In this specification, the positive or forward direction of the main axis of the reversible circulator 600 is defined as extending from left to right as viewed in either FIG. 6a or 6b. Consequently, as used in this document, the term "emanating from" refers to light or signal propagation along the positive main axis, from left to right, of circulator 600, and the term "destined for" refers to light propagation in the reverse direction, from right to left, along the negative direction of the main axis of the circulator 600.

Disposed adjacent to the end of ferrule 615 is a first birefringent walk-off plate 609 which has the property of separating any signal light ray emanating from any of the ports 601–604 into two physically separated linearly polarized sub-signal rays—one innermost and one outermost sub-signal ray. This separation of signals into sub-signals is accomplished by deflection or offset of the path of one—the e-ray—of each pair of sub-signals in a first direction perpendicular to the circulator main axis. Because four ports exist, eight separate sub-signals are so defined and are comprised of four outermost and four innermost sub-signals. The outermost and innermost sub-signals from both Port A 601 and Port B 602 comprise e-rays and o-rays, respectively, in their traverse through birefringent plate 609. Conversely, the outermost and innermost sub-signals from both Port C 603 and Port D 604 comprise o-rays and e-rays, respectively, in their traverse through birefringent plate 609.

Disposed adjacent to the first birefringent plate 609 and on the side of plate 609 opposite to ferrule 615 are both a first 610 and a second 611 optical rotator, respectively. These two optical rotators, 610 and 611, have the property of rotating the orientation of the plane of polarized light passing therethrough by 90° around or about the light propagation direction. In the preferred embodiment, both optical rotators 610 and 611 comprise half wave plates, although either or both may comprise some other type of optically active element such as a liquid crystal device. Optical rotator 610 is disposed so as to intercept only the two outermost sub-signals arising from or destined for Port A 601 and Port B 602. Likewise, optical rotator 611 is disposed so as to intercept only the two outermost sub-signals arising from or destined for Port C 603 and Port D 604.

A second birefringent walk-off plate 612 is disposed adjacent to the two reciprocal optical rotators 610 and 611 on the side opposite to the first birefringent plate 609. The thickness and optical orientation of birefringent plate 612 are chosen so as to provide an offset in the first direction of one of the rays propagating therethrough by a distance equivalent to the common center-to-center inter-port separation distance.

A pair of 45° optical polarization rotation elements—a reciprocal optical rotator 616 and a non-reciprocal optical rotator 617—are disposed to the side of the second birefringent walk-off plate 612 opposite to the 90° optical rotators 610 and 611. As shown in FIG. 6b, the reciprocal optical rotator 616 is disposed so as to intercept all and only those sub-signal light rays either emanating from or destined for Port A 601 and Port C 603. The polarization plane direction of linearly polarized light of sub-signals propagating through reciprocal optical rotator 616 is reversibly rotated by 45° in the clockwise (CW) direction. The non-reciprocal optical rotator 617 is disposed so as to intercept all and only those sub-signal light rays either emanating from or destined for Port B 602 and Port D 604. The polarization plane direction of linearly polarized light of sub-signals propagating through non-reciprocal optical rotator 617 is non-reversibly rotated by 45° in the counter-clockwise (CCW) direction.

A switchable 90° optical rotation element 618 is disposed to the side of either the reciprocal optical rotator 616 or the non-reciprocal optical rotator 617 opposite to that of the plate 612. The switchable 90° optical rotation element 618 is controlled so as to rotate or not rotate the polarization plane of all light either emanating from or destined for exactly two of the optical ports. If, as in the example illustrated in FIG. 6b, the switchable rotation element 618 is disposed adjacent to non-reciprocal rotator 617, then the switchable rotation element 618 can rotate the polarization plane of all and only those sub-signal light rays either emanating from or destined for Port B 602 and Port D 604. If, on the other hand, the switchable rotation element 618 is disposed adjacent to reciprocal rotator 616, then the switchable rotation element 618 is capable of rotating the polarization plane of all and only those sub-signal light rays either emanating from or destined for Port A 601 and Port C 603.

A lens or lens assembly 613 is disposed to the side of element 618 opposite to rotation elements 616 and 617. Finally, a mirror 614 is disposed at the focal point of lens 613 opposite to the rotation elements 616–618.

The two states of switchable 90° optical rotation element 618 comprise a first state in which the orientation of the plane of polarized light either emanating from or destined for the two ports in question is rotated by 90° and a second state in which the orientation is not rotated. In the preferred embodiment of the present invention, the switchable 90° optical rotation element 618 comprises the half wave plate 186 of a differential phase retardance switch 180, as shown in FIG. 4a. FIG. 6c shows an end view of the circulator 600 illustrating the disposition of element 618 in relation to the differential phase retardance switch 180 and a few other selected components of reversible circulator 600. In the preferred embodiment of reversible circulator 600, the first and second state of switchable 90° optical rotation element 618 respectively correspond to the situation in which the element 618 is disposed so as to not intercept and so as to intercept optical ray paths emanating from or destined for the two ports in question. As further illustrated in FIG. 6c, the two states of element 618 are controlled by the latching state of switch 180 and the fast and slow optical orientations of the wave plate comprising element 618 are disposed horizontal and vertical or vice versa. In an alternative embodiment, the two-state 90° optical rotation element 618 may comprise a liquid crystal device, wherein the two polarizing states of the liquid crystal device are controlled by a voltage applied across the device.

As used in this specification, the terms "reciprocal optical rotator" or equivalently "reversible optical rotator" or "reciprocally rotating optical element" refer to optical components having the property such that the direction of rotation about the axis of light propagation, either clockwise (CW) or counter-clockwise (CCW), of the plane of polarization of linearly polarized light propagated therethrough is always the same when viewed facing the rotator towards the side at which the linearly polarized light beam enters the component. Conversely, the terms "non-reciprocal optical rotator" or equivalently "non-reversible optical rotator" or "non reciprocally rotating optical element" refer to optical components having the property such that the direction of rotation about the axis of light propagation, either clockwise (CW) or counter-clockwise (CCW), of the plane of polarization of linearly polarized light propagated therethrough is always the same when viewed facing the rotator from a fixed reference point in a fixed direction, regardless of the propagation direction of the light ray through the element. Non-reciprocal rotators typically comprise Faraday rotators, which rotate polarization planes of polarized light passing therethrough in response to or under the influence of an external magnetic field. A magnet or magnets in close proximity to the Faraday rotator usually produce the external magnetic field. In the case in which the non-reciprocal rotator 617 comprises a Faraday rotator, the optical circulator 600 also comprises such magnets but, for clarity, these magnets are not shown in FIGS. 6a–6c.

Figure 8:
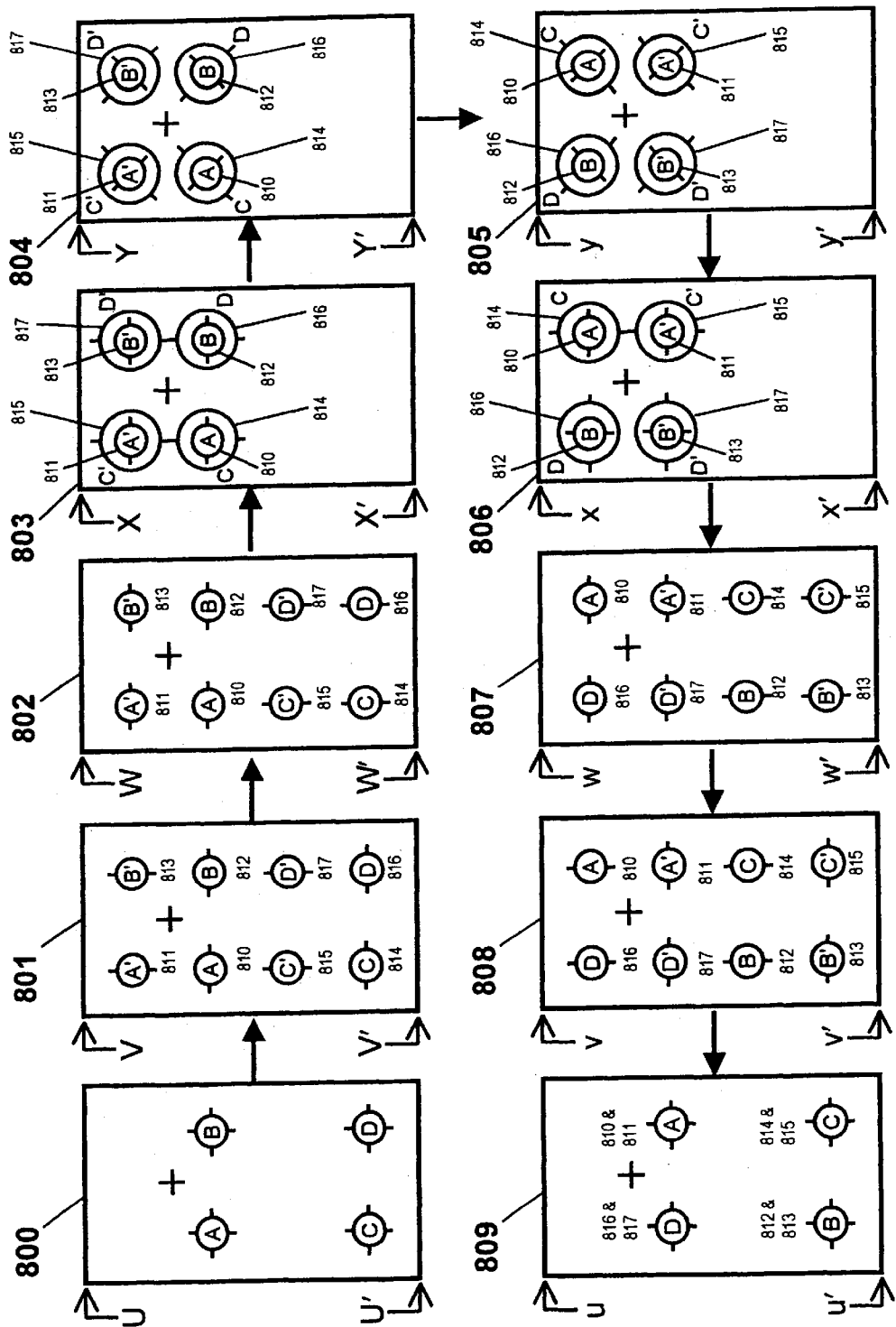
FIGS. 8 and 9 are sequences of cross sections through the preferred embodiment of the reversible circulator in accordance with the present invention.
Figure 9:
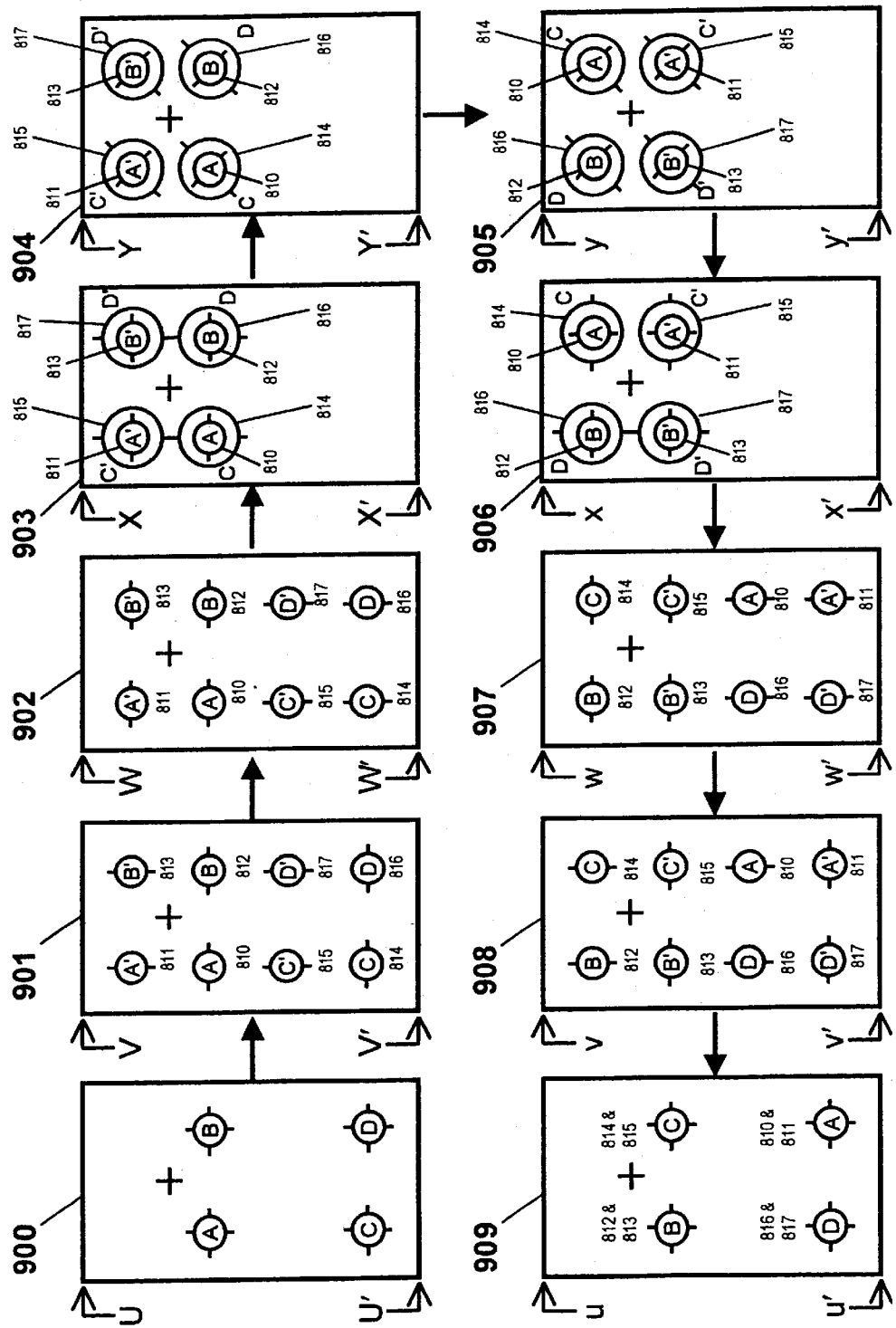

The operation of circulator 600 is described herein below with reference to FIG. 8 and FIG. 9. FIGS. 8 and 9 are both sequences of cross sections through the reversible circulator 600 illustrating the locations and polarization states of port images created by the light of signals and sub-signals propagating therethrough in accordance with the present invention. The cross sections of FIG. 8 represent operation of the reversible circulator 600 in which the switchable 90° optical rotation element 618 is in its first, "off," or no-rotation state. Conversely, the cross sections of FIG. 9 represent operation of the reversible circulator 600 in which the switchable 90° optical rotation element 618 is in its second or 90°-rotation state.

The cross-sections of FIGS. 8–9 are all drawn as viewed from the left side of the device 600 of FIGS. 6a and 6b and are taken at the labeled cross-sectional planes U–U', V–V', W–W', X–X', and Y–Y'. These cross-sections correspond to locations similarly labeled on FIGS. 6a and 6b. In the cross sections of FIGS. 8–9, the centers of labeled circles denote the positions of port images created by sub-signals propagating through circulator 600 as projected onto the respective cross section. Concentric circles of different sizes indicate overlapping or co-propagating sub-signals. The sizes of these circles in the diagrams of FIGS. 8–9 have no physical significance. Barbs on the circles of FIGS. 8–9 indicate the orientations of polarization planes of the linearly polarized sub-signals that the respective circles represent. Circles with two pairs of barbs represent unpolarized or randomly polarized light or else superimposition of two lights with differing linear polarization orientations. A cross ("+") in each cross-section of FIGS. 8–9 represents the projection of the center of the lens 613 onto the cross section along a line parallel to the circulator main axis.

As will be evident from the discussion following, all sub-signal light is reflected by the mirror 614 of the reversible circulator 600 so as to make one complete forward and one complete return traverse through reversible circulator 600. Therefore, each cross-section of sub-signal port images is shown twice, one time labeled with capital letters to denote forward propagation (FIGS. 8–9, upper rows) along the positive direction of the circulator main axis and one time labeled with small letters (FIGS. 8–9, lower rows) to denote reverse propagation along the negative direction of the circulator main axis. Heavy arrows indicate the sequence of images produced by light signals propagating through the reversible circulator 600.

The paths of signals and sub-signals propagating through reversible circulator 600 in its first state are now described with reference to FIG. 8. As seen in cross section U–U' 800 of FIG. 8, signals emanating from each of the four ports— Port A 601, Port B 602, Port C 603 and Port D 604—are comprised of unpolarized light. After emanating from one of the four ports and passing through one of the collimator lenses 605–608, signal light enters and passes through the first birefringent plate 609 which separates it into physically separated horizontally and vertically polarized sub-signal components. In FIG. 8, sub-signal A 810, sub-signal B 812, sub-signal C 814 and sub-signal D 816 represent the images of horizontally polarized sub-signal light emanating, respectively, from Port A 601, Port B 602, Port C 603 and Port D 604. Likewise, sub-signal A' 811, sub-signal B' 813, sub-signal C' 815 and sub-signal D' 817 represent the images of vertically polarized sub-signal light emanating, respectively, from Port A 601, Port B 602, Port C 603 and Port D 604. It is to be noted the terms "vertical" and "horizontal" are used in this specification in a relative sense only and do not necessarily imply any particular spatial orientation of the referred-to apparatus or component.

The four vertically polarized sub-signals A' 811, B' 813, C' 815 and D' 817 all comprise e-rays during their traverse through the first birefringent plate 609. Therefore, as shown in cross-section V–V' 801, sub-signals 811, 813, 815 and 817 are all shifted in the first direction with respect to the corresponding horizontally polarized sub-signals 810, 812, 814 and 816, respectively. After passing through the first birefringent plate 609, the four outermost sub-signals A' 811, B' 813, C 814 and D 816 pass through one of the two 90° optical rotators, 610 and 611, and therefore their light rays incur 90° rotations of the orientations of their polarization planes. Thus, as shown in cross section W–W' 802, the polarization plane directions of sub-signals A' 811 and B' 813 change from vertical to horizontal while those of sub-signals C 814 and D 816 change from horizontal to vertical.

After passing the positions of the reciprocal optical rotators 610 and 611, all sub-signals enter and pass through the second birefringent walk-off plate 612. The four vertically polarized sub-signals C' 815, D' 817, C 814 and D 816 traverse birefringent plate 612 as e-rays and are thus deflected in the first direction while the four horizontally polarized sub-signals A' 811, B' 813, A 810 and B 812 traverse birefringent plate 612 as undeflected o-rays. The optical orientation and thickness of birefringent plate 612 are chosen such that the lateral deflection of e-rays upon traversing therethrough is exactly equal to the center-to-center inter-port separation distance. For this reason, after passing through birefringent plate 612, the two sub-signal images C' 815 and C 814 become superimposed on the sub-signal images A' 811 and A 810, respectively and the two sub-signal images D' 817 and D 816 become superimposed on the sub-signal images B' 813 and B 812, respectively. Furthermore, the two sub-signals comprising each pair of superimposed sub-signals each follow identical paths until later separated during their return paths. This superimposition of sub-signals is shown in cross section X–X' 803 of FIG. 8.

After exiting plate 612, each pair of superimposed sub-signals, A' 811 and C' 815, A 810 and C 814, B' 813 and D' 817, and B 812 and D 816 each travels along its own path with the two sub-signals comprising each pair remaining superimposed, one upon the other. The two pairs of sub-signals A' 811 and C' 815 and A 610 and C 614, which comprise all and only that light originating from Port A and Port C, pass through the 45° reciprocal optical rotator 616. In passing through reciprocal optical rotator 616, the polarization plane directions of light comprising these four sub-signals are all rotated by an angle of 45° CW around or about their propagation directions. The two pairs of sub-signals B' 813 and D' 817 and B 812 and D 816, which comprise all and only that light originating from Port B and Port D, pass through the non-reciprocal optical rotator 617. In passing through non-reciprocal optical rotator 617, the polarization plane directions of light comprising these four sub-signals are all rotated by an angle of 45° CCW around or about their propagation directions. Barbs in cross section Y–Y' 804 show the orientations of the polarization planes of light of the various sub-signals after exiting elements 816 and 817.

The four pairs of sub-signals travel to and through the lens 613, which brings them all to a common focal point at mirror 614. The mirror 614 immediately reflects all sub-signals back along their return paths through circulator 600. Because the focal point of the lens 613 is on the plane of mirror 614, the four pairs of sub-signals immediately diverge from one another after being reflected by the mirror 614 and pass through lens 613 a second time in the reverse direction. The diverging pathways of the four pairs of returning sub-signals are set once again parallel to one another by lens 613. Because the projection of the center of lens 613 onto cross-section Y–Y' 804 is centrally located between the four pairs of port images and because the focal point of lens 613 is on mirror 614, the four pairs of sub-signals are directed back towards reciprocal optical rotator 616 and non-reciprocal optical rotator 617 along pathways which exactly superimpose upon those of forward propagating pairs of sub-signals.

Cross section y–y' 805 shows the locations of the pairs of superimposed sub-signal images at their points of return entry into reciprocal optical rotator 616 and non-reciprocal optical rotator 617. The focusing and re-collimation of sub-signal images by lens 613 causes the inversion of image positions about the center of the lens as projected onto cross-section y–y' 805. This inversion causes interchange of the positions of opposing pairs of sub-signals as projected onto cross-section y–y' 805. Thus, upon re-entry into either reciprocal optical rotator 616 or non-reciprocal optical rotator 617, as shown in cross-section y–y' 805, the location of the returning pair of sub-signal images B 812 and D 816 is the same as that of the forward propagating pair of sub-signals A' 811 and C' 815. Likewise, in cross-section y–y' 805, the locations of returning pairs of sub-signals A 810 and C 814, B' 813 and D' 817, and A' 811 and C' 815 are identical to those of forward propagating pairs of sub-signals B' 813 and D' 817, A 810 and C 814, and B 812 and D 816, respectively.

Because of the inversion properties of lens 613, each of the returning sub-signals within reversible circulator 600 encounters an optical rotation element—either the reciprocal optical rotator 616 or the non-reciprocal optical rotator 617—through which it did not pass during its forward path through reversible circulator 600. Thus, after passing through lens 613 on their return traverse through reversible circulator 600, the sub-signals B 812, B' 813, D 816 and D' 817 all pass through reciprocal optical rotator 616 and thus their light rays incur 45° CW rotations of the directions of their polarization planes. Because reciprocal optical rotator 616 is a reversible optical rotator and the sub-signal propagation in question is in the return direction, this rotation has an apparent CCW direction as viewed from the left side of the device 600 and as indicated in FIG. 8. The sub-signals A 810, A' 811, C 814 and C' 815 all pass through non-reciprocal optical rotator 617 and thus their light rays incur 45° CCW rotations of the directions of their polarization planes after passing through lens 613 on their return traverse through reversible circulator 600. Because non-reciprocal optical rotator 617 is a non-reversible optical rotator, the rotation of the polarization planes of sub-signals passing therethrough is always in the CCW direction as viewed from the left side of the device 600. The polarization state of each of the sub-signals after passing through either reciprocal optical rotator 616 or non-reciprocal optical rotator 617 in the return direction is therefore either horizontal or vertical as indicated in cross section x–x' 806 of FIG. 8. With the circulator 600 in its first state, as shown in FIG. 8, the optical rotation element 618 causes no additional polarization plane rotation of sub-signals passing between cross section y–y' 805 and cross section x–x'.

During return passage through the second birefringent plate 612, the vertically polarized sub-signals B 812, C 814, B' 813 and C' 815 pass therethrough as deflected e-rays while the horizontally polarized sub-signals D 816, A 810, D' 817 and A' 811 pass therethrough as undeflected o-rays. For this reason, the two sub-signals comprising each pair of superimposed sub-signals become re-separated one from another upon passing through birefringent plate 612 a second time. The deflection of sub-signals B 812, C 814, B' 813 and C' 815 upon their second traverse through birefringent plate 612 is exactly equal and opposite to the deflection of sub-signals C' 815, D' 817, C 814, and D 816 and during their first traverse through this plate 612. Therefore, the locations of the images of the various sub-signals after the second traverse of these sub-signals through birefringent plate 612 are as shown in cross section w–w' 807 of FIG. 8.

After exiting the second birefringent plate 612, the outermost returning sub-signals D 816, A 810, B' 813 and C' 815 pass through one of the two 90° optical rotators, 610 and 611, and therefore their light rays incur 90° rotations of the orientations of their polarization planes. As a result of these rotations, the polarization plane directions of light of sub-signals D 816 and A 810 become vertical and those of the light of sub-signals B' 813 and C' 815 become horizontal. The positions and polarization states of the various sub-signals are thus as shown in cross section v–v' 808 after passing, in the return direction, the positions of the 90° reciprocal optical rotators, 610 and 611.

Finally, all sub-signals enter the first birefringent walk-off plate 609 in the return direction. The vertically polarized sub-signals D 816, A 810, B 812 and C 814 pass through plate 609 as deflected e-rays whilst the horizontally polarized sub-signals D' 817, A' 811, B' 813 and C' 815 pass through plate 609 as undeflected o-rays. The deflection of sub-signals D 816, A 810, B 812 and C 814 during return passage through plate 609 is exactly equal and opposite to the deflection of sub-signals A' 811, B' 813, C' 815 and D' 817 during their forward passage through this plate 609. Therefore, the vertically and horizontally polarized pairs of sub-signals A 810 and A' 811, B 812 and B' 813, C 814 and C' 815, and D 816 and D' 817 become recombined at the positions of the collimator lenses 605–608. Each of the collimator lenses focuses the return-path signal impinging thereon into the immediately adjacent port. As shown in cross section u–u' 809, therefore, the recombined signals are located such that the signals originally from Port A, from Port B, from Port C and from Port D are directed into Port B, Port C, Port D and Port A, respectively. In this fashion, when reversible circulator 600 is in its first or "off" state, it functions as a logical "clockwise" optical circulator.

FIG. 9 illustrates the operation of reversible circulator 600 in its second or "on" state. In this first state, the switchable 90° optical rotation element 618 imposes a 90° rotation upon the polarization plane orientation of plane polarized light passing therethrough. The manifestation of this 90° rotation is illustrated in the sequence of cross sections 903–904 and in the sequence of cross sections 905–906 in FIG. 9. In passing from cross section X–X' 903 to Y–Y' 904, the sub-signals B 812, B' 813, D 816 and D' 817 all pass through the non-reciprocal optical rotator 617 as well as through switchable 90° optical rotation element 618. The polarization planes of these four sub-signals are first rotated 45° CCW by non-reciprocal optical rotator 617 and then rotated an additional 90° by element 618. The net effect of these two rotations in sequence is equivalent to a 45° CW rotation of the polarization planes of sub-signals B 812, B' 813, D 816 and D' 817 between cross section X–X' 903 and cross section Y–Y' 904. The polarization plane orientation of light of sub-signals A 810, A' 811, C 814 and C' 815 only undergoes a single 45° CW rotation from passage through reciprocal optical rotator 616 as previously described in the discussion to FIG. 8.

In passing from cross section y–y' 905 to x–x' 906, the sub-signals A 810, A' 811, C 814 and C' 815 all pass through the switchable 90° optical rotation element 618 followed by the non-reciprocal optical rotator 617. Thus, the polarization planes of these four sub-signals are first rotated by 90° by element 618 and then rotated an additional 45° CCW (as viewed from the left side of FIGS. 6a and 6b according to the convention of FIGS. 8–9) by element 617. The net effect of these two rotations in sequence is equivalent to a 45° CW rotation (as viewed from the left of FIGS. 6a–6b) of the polarization planes of sub-signals A 810, A' 811, C 814 and C' between cross section y–y' 905 and cross section x–x' 906.

Each of the sub-signals 810–817 incurs an additional 90° rotation of its polarization plane orientation when reversible circulator 600 is in its second or "on" state relative to the situation in which reversible circulator 600 in its first or "off" state. This additional 90° rotation is illustrated by comparison of cross sections 907, 908 and 909 with cross sections 807, 808 and 809, respectively. Because of this additional 90° rotation in the "on" state of reversible circulator 600, the identities of o-rays and e-rays are interchanged from those in the "off" state during the return passage of sub-signals through second birefringent plate 612. Thus, in the "on" state, the paths of sub-signals D 816, A 810, D' 817 and A' 811 are deflected during the return passage through second birefringent plate 612 (FIG. 9), but, in the "off" state, those of B 812, C 814, B' 813 and C' 815 are instead deflected (FIG. 8). As a final result, with reversible circulator 600 in the first or "on" state, the light signals from Port A, Port B, Port C and Port D are respectively directed to Port D, Port A, Port B and Port C. Thus, in this fashion, when reversible circulator 600 is in its second or "on" state, it functions as a logical "counterclockwise" optical circulator.

Figure 10B:
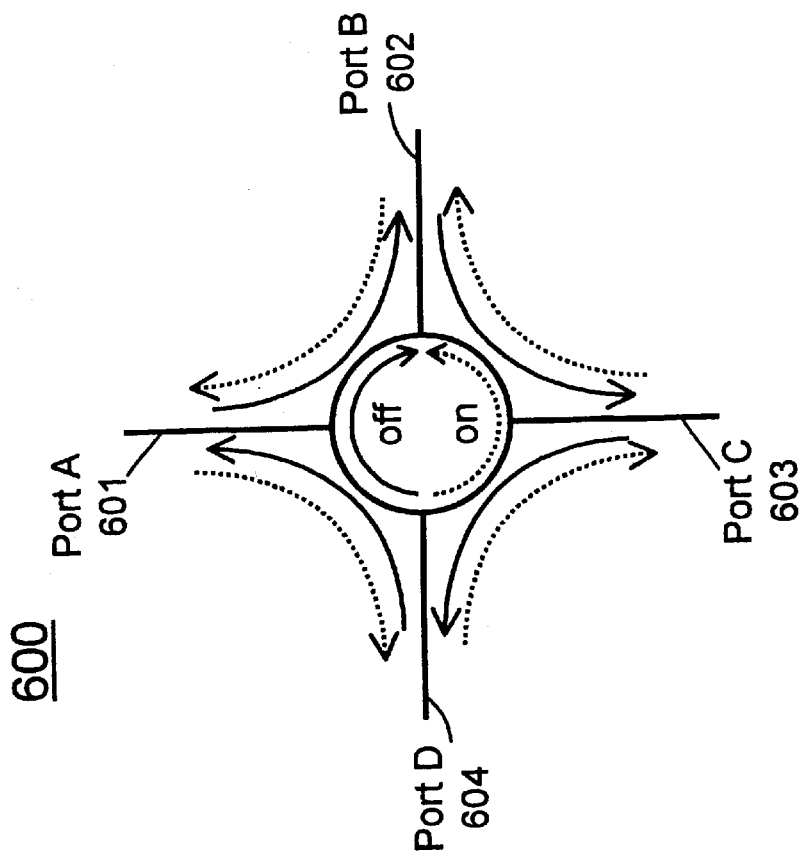
FIG. 10b illustrates the operation of a preferred embodiment of a reversible circulator in accordance with the present invention.
Figure 10A:
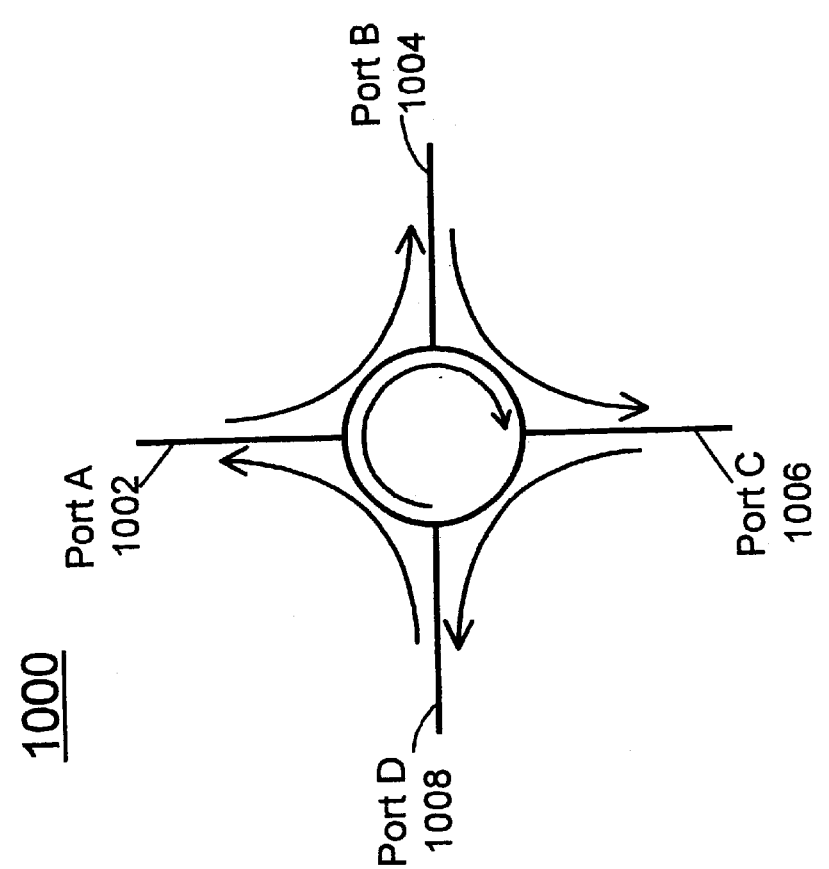
FIG. 10a illustrates the operation of a conventional 4-port optical circulator.

FIG. 10a illustrates the operation of a conventional four-port optical circulator 1000. In the circulator 1000, light input to Port A 1002 is output from Port B 1004, light input to Port B 1004 is output from Port C 1006, light input to Port C 1006 is output from Port D 1006 and light input to Port D 1008 is output from Port A 1002. This operation is termed herein as "clockwise" optical circulation.

By contrast, FIG. 10b illustrates the operation of the preferred embodiment of the reversible optical circulator 600 in accordance with the present invention. In its "off" state, the reversible circulator 600 operates with "clockwise" optical circulation. However, in its "on" state, the reversible circulator 600 operates with "counterclockwise" optical circulation, which is exactly opposite to "clockwise" circulation. The "clockwise" or "counterclockwise" state of reversible circulator 600 is controlled by the state of the switchable 90° optical rotation element 618. When switchable 90° optical rotation element 618 is in its "on" state such that there is effected a 90° rotation of the polarization plane of plane polarized light passing therethrough or there-past, then reversible circulator 600 operates in the "counterclockwise" state. However, when switchable 90° optical rotation element 618 is in its "off" state such that there is no polarization plane rotation of plane polarized light passing therethrough or there-past, then the operation of reversible circulator 600 is "clockwise". When the switchable 90° optical rotation element 618 comprises the half-wave plate of a differential phase retardance switch 180 in accordance with the present invention, then the reversible circulator 600 can be switched between its two circulatory states in approximately one millisecond.

Figure 11A:
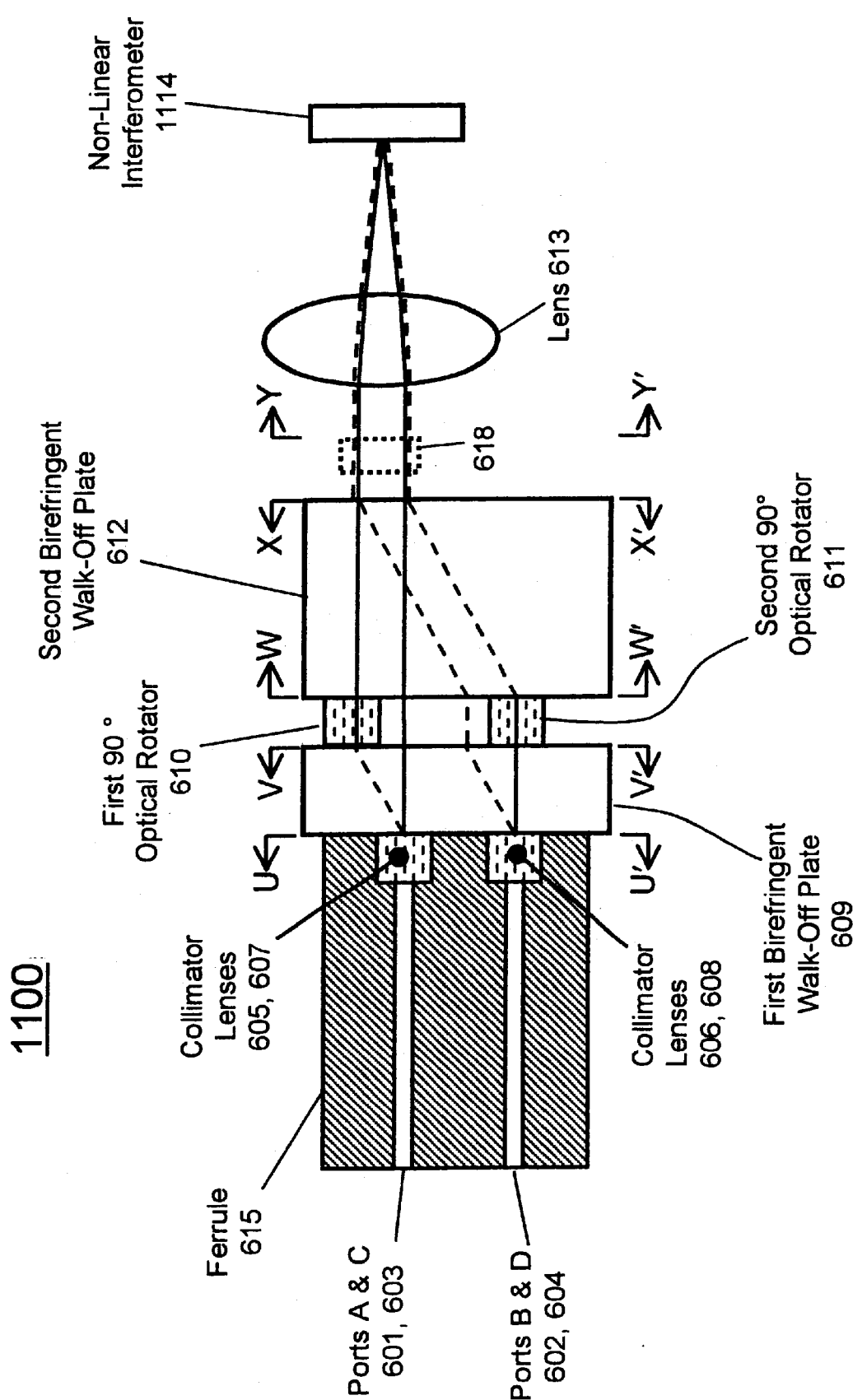
FIGS. 11a, 11b and 11c are, respectively, a side view, a top view and an end view of a preferred embodiment of a switchable optical channel separator in accordance the present invention.
Figure 11B:
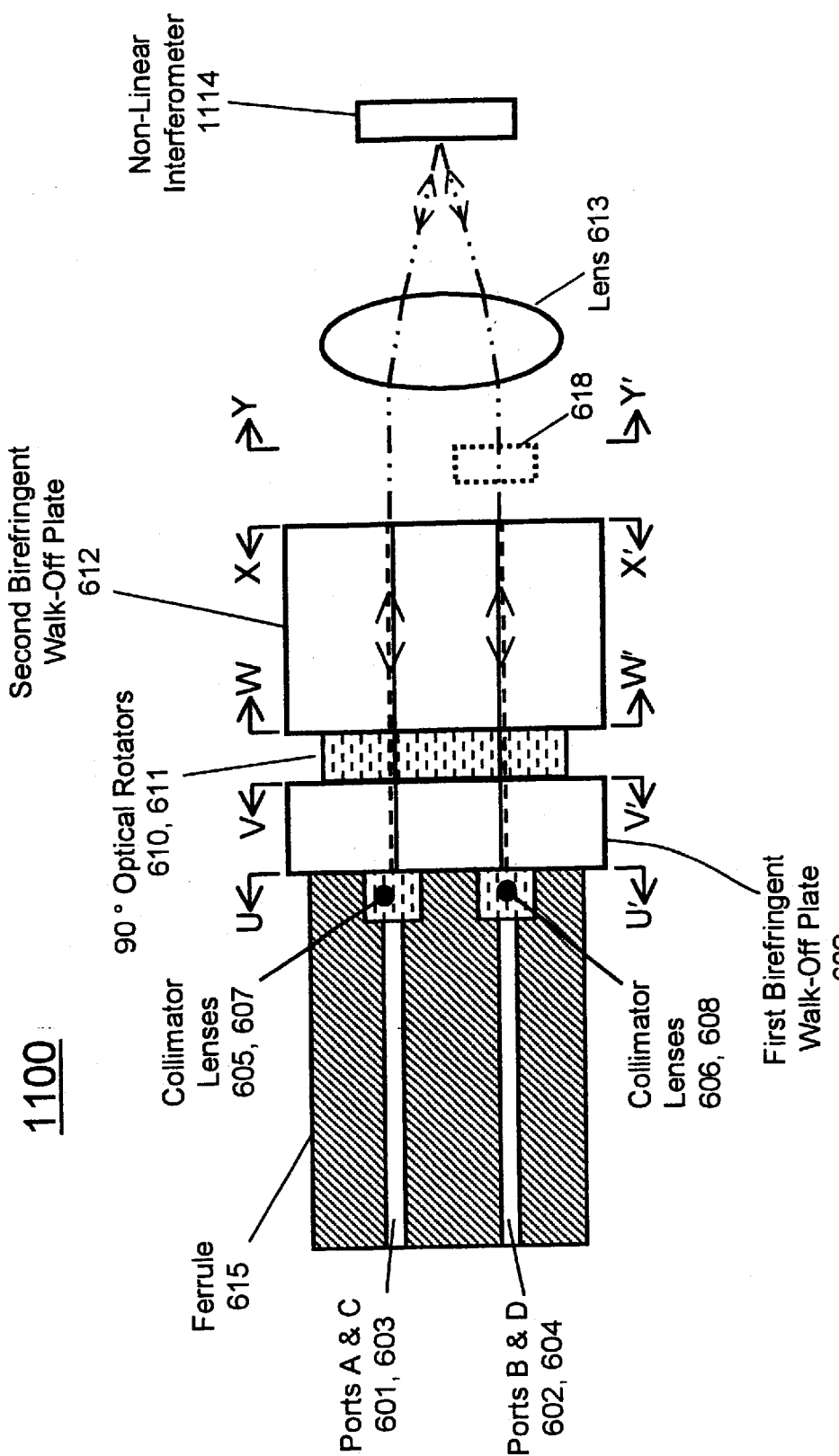
Figure 11C:
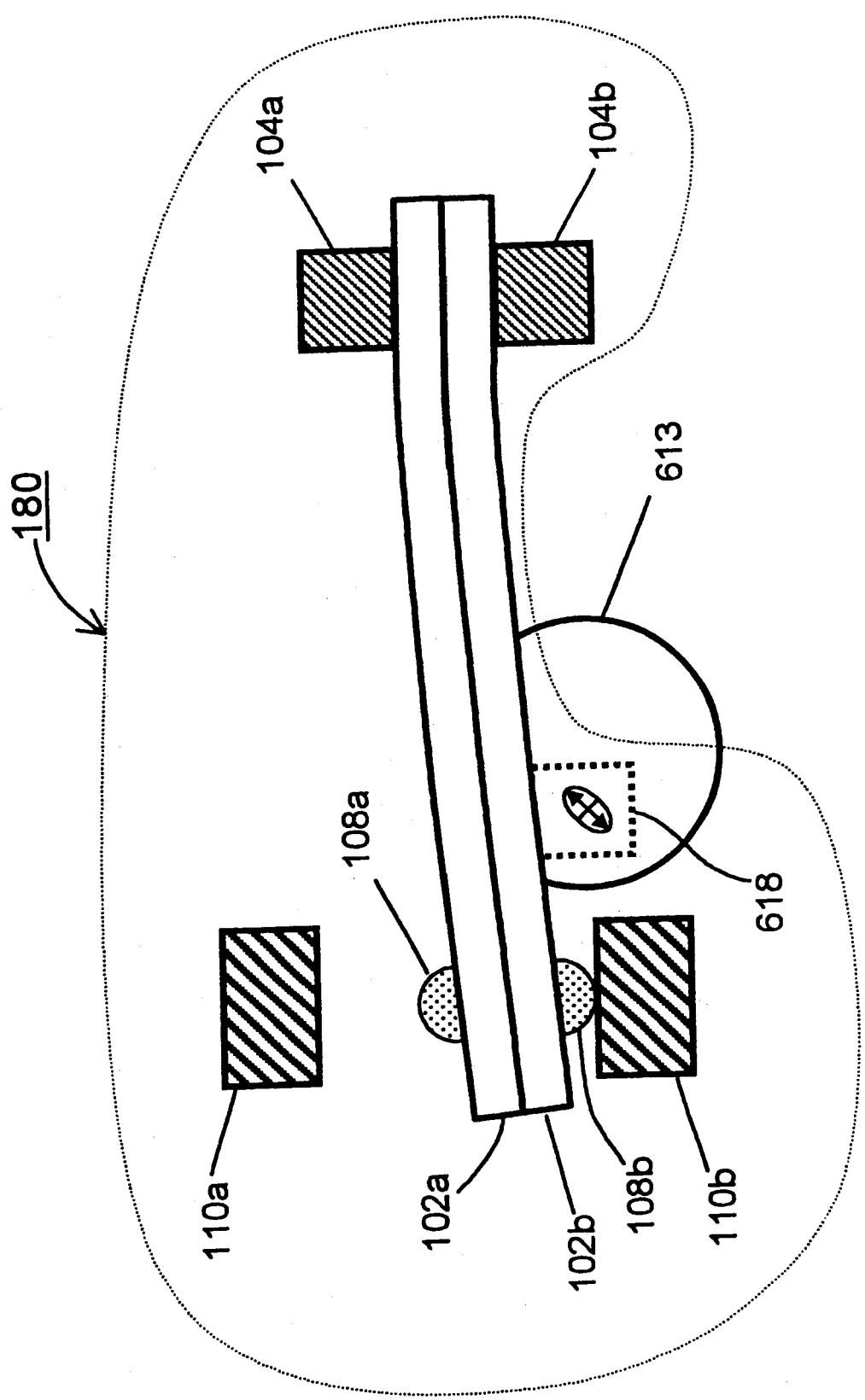

FIGS. 11a and 11b are side and top views, respectively, of a preferred embodiment of a switchable optical channel separator in accordance with the present invention which utilizes the differential phase retardance switch 180. Most of the components comprising the switchable optical channel separator 1100 illustrated in FIGS. 11a–11b are identical in type and disposition to their counterparts in the reversible circulator 600 and are therefore numbered similarly to those counterparts as shown in FIGS. 6a and 6b. However, the switchable optical channel separator 1100 does not comprise the reciprocal rotator 616 or the non-reciprocal rotator 617, and comprises a non-linear interferometer 1114 in place of the mirror 614. The switching capability of switchable optical channel separator 1100 is derived from the operation of the switchable 90° optical rotation element 618 which, in the preferred embodiment, comprises the half-wave plate of a differential phase retardance switch 180 of the present invention, as is illustrated in FIG. 11c.

The non-linear interferometer 1114 is an instance of an invention disclosed in a co-pending U.S. Patent Application, incorporated herein by reference, entitled "Nonlinear Interferometer for Fiber Optic Wavelength Division Multiplexer Utilizing a Phase Differential Method of Wavelength Separation," Ser. No. 09/247,253, filed on Feb. 10, 1999, and also in a second co-pending U.S. Patent Application, also incorporated herein by reference, entitled "Dense Wavelength Division Multiplexer Utilizing an Asymmetric Pass Band Interferometer", Ser. No. 09/388,350 filed on Sep. 1, 1999. The non-linear interferometer 1114 has the property such that, if the light beam reflected therefrom is an optical signal comprised of a plurality of channels and the light of each channel is linearly polarized, then the light of every member of a second set of channels is reflected with a 90° rotation of its polarization plane direction while the light of every member of a first set of channels, wherein the first and second channel sets are interleaved with one another, is reflected with unchanged polarization. In the following discussion, the channels whose light rays experience the 90° polarization-plane rotation upon interaction with non-linear interferometer 1114 are arbitrarily referred to as "even" channels and the remaining channels are referred to as "odd" channels. The patent application with Ser. No. 09/247,253 teaches the operation of an interferometer in which all channels have identical channel spacings and channel band widths. The patent application with Ser. No. 09/388,350 teaches the operation of an interferometer in which the channel bandwidths of the first interleaved set of channels are not the same as those of the second interleaved set of channels and the channel spacing is not uniform.

Figure 12:
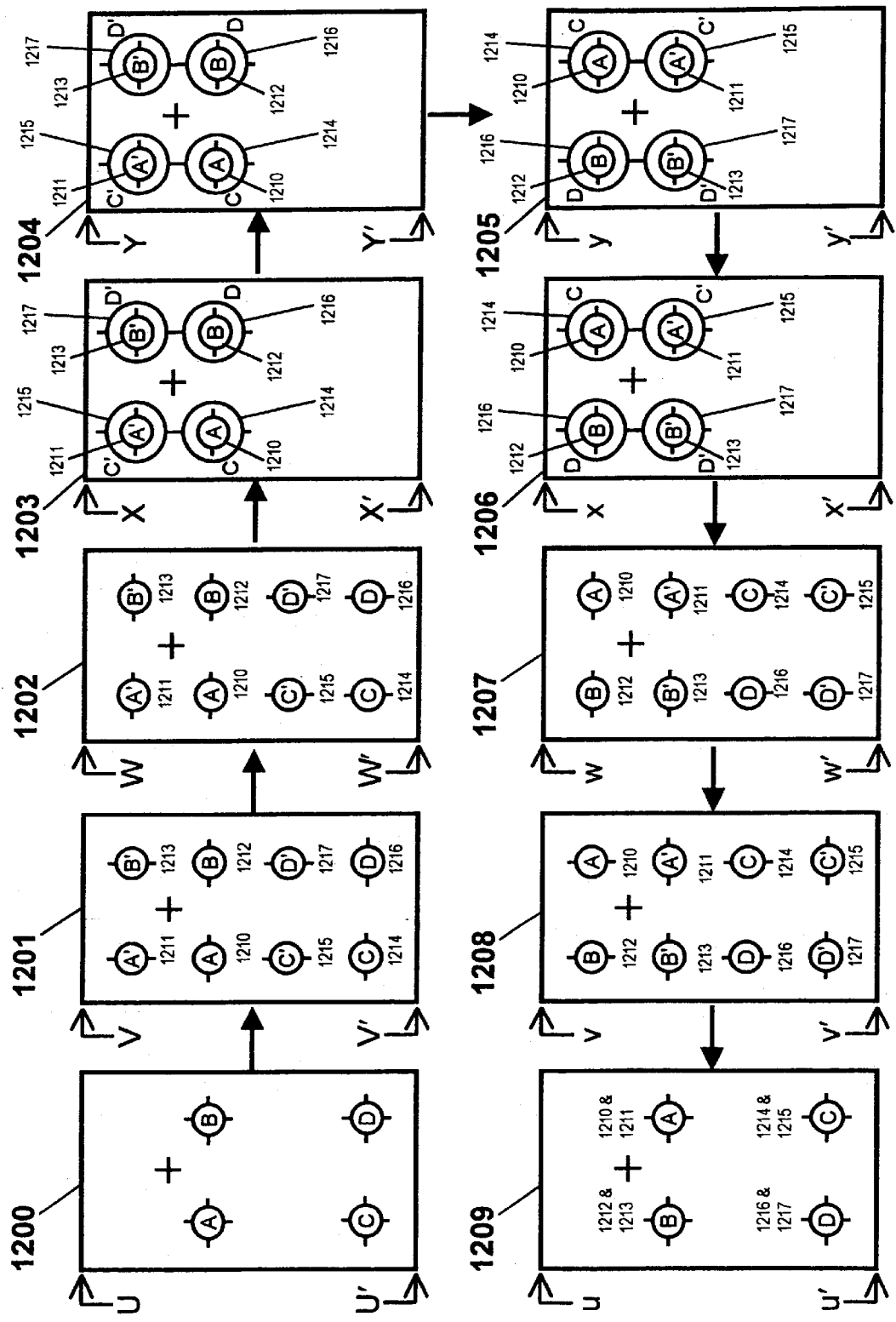
FIGS. 12–15 are sequences of cross sections through the preferred embodiment of the switchable optical channel separator in accordance with the present invention.
Figure 13:
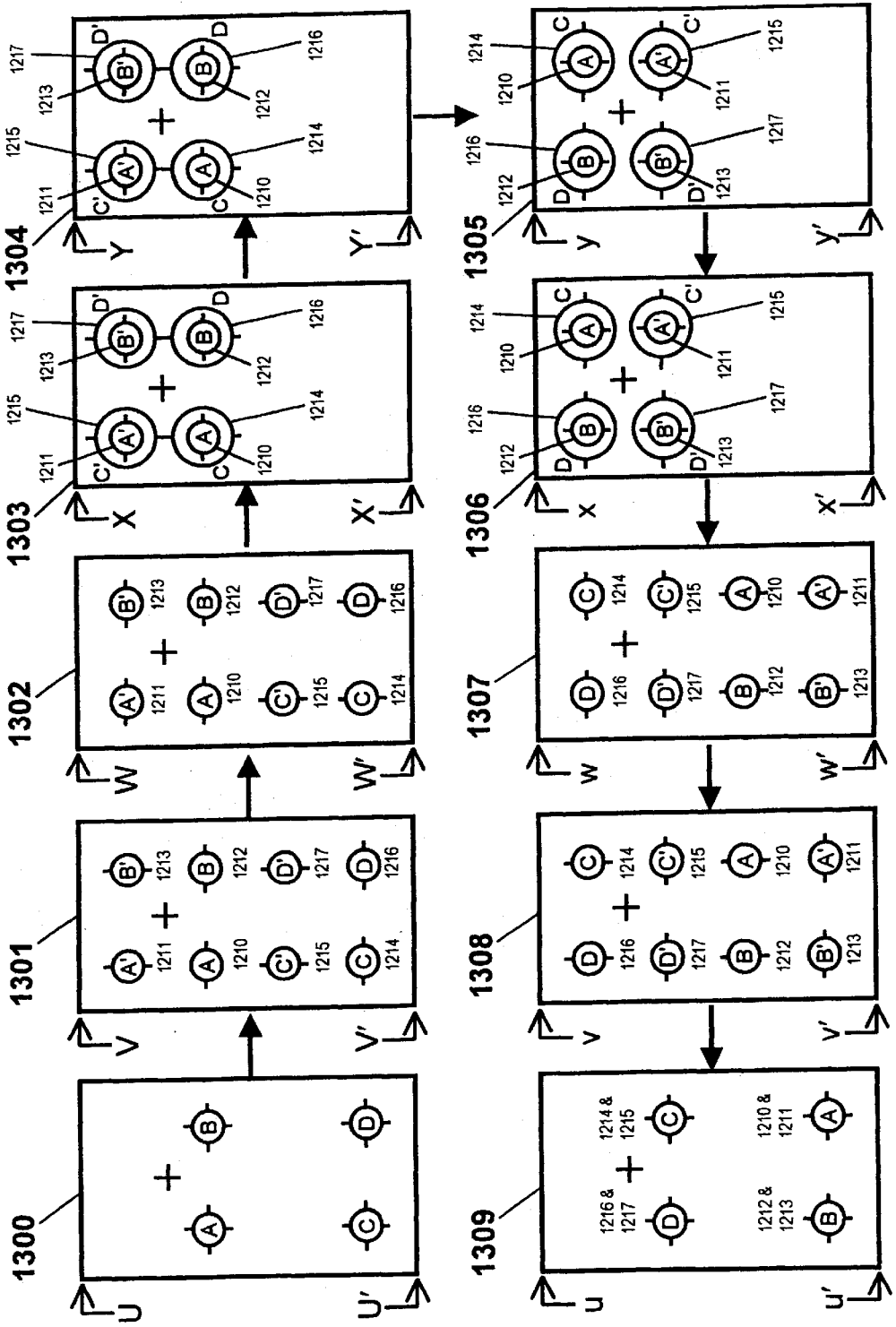
Figure 14:
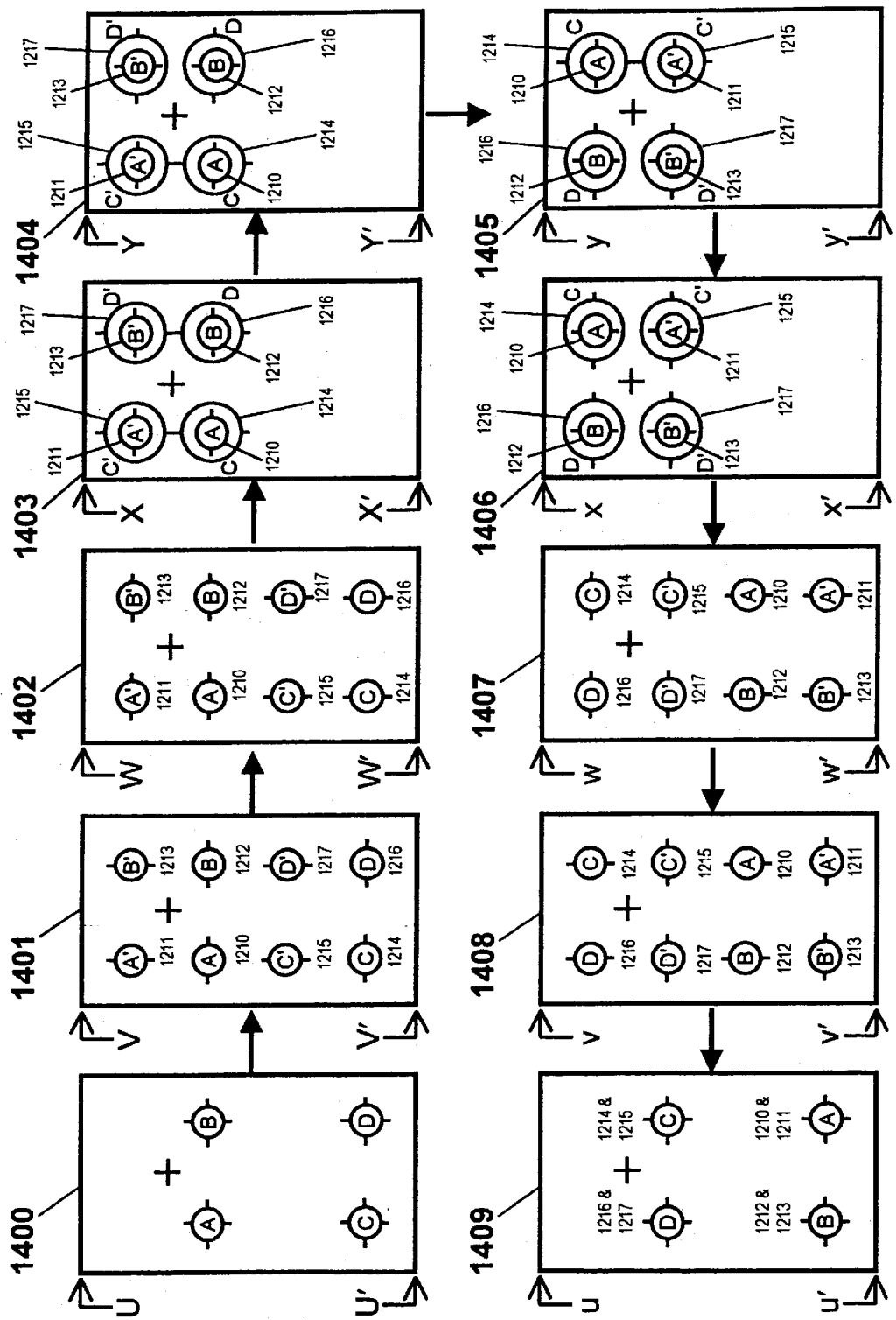
Figure 15:
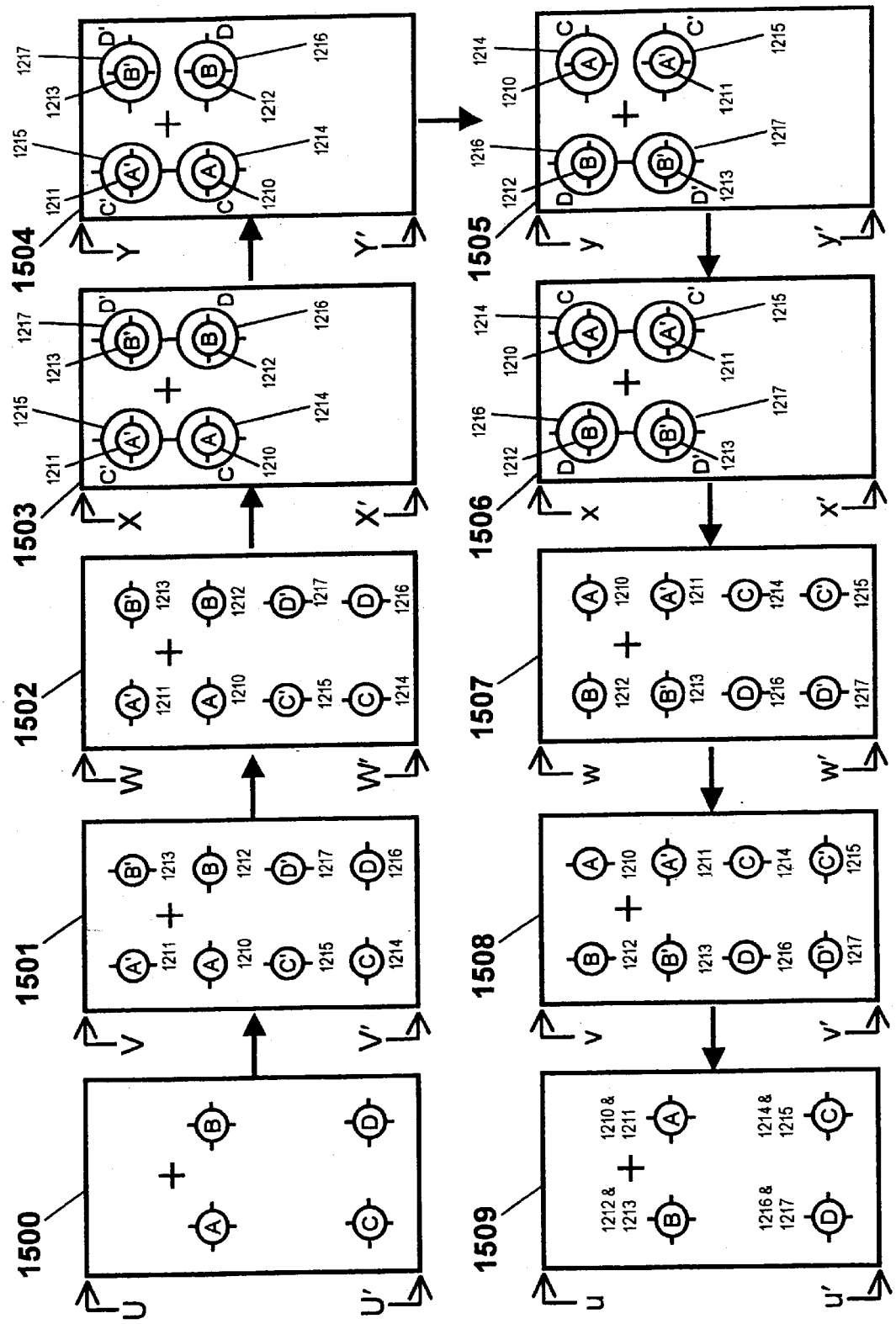

FIGS. 12–15 illustrate the operation of the switchable optical channel separator 1100 and, similarly to FIGS. 8–9, comprise sequences of cross sections through separator 1100 illustrating the locations and polarization states of fiber images. FIGS. 12 and 13 illustrate the propagation of signals of odd and even channels, respectively, through the separator 1100 in its first state. This first state is such that the switchable 90° optical rotation element 618 does not rotate the polarization plane of polarized light passing therethrough. FIGS. 14 and 15 illustrate the propagation of signals of odd and even channels, respectively, through the separator 1100 in its second state. This second state is such that the switchable 90° optical rotation element 618 rotates the polarization plane of polarized light passing therethrough.

The basic principles of operation of channel separator 1100, as illustrated in FIGS. 12–15, are similar to those of the reversible circulator 600, as previously illustrated in FIGS. 8–9, and are not repeated here. However, it is to be kept in mind that, in FIGS. 12 and 13, the switchable 90° optical rotation element 618 is not disposed so as to rotate signal light polarization and thus the two members of each of the pairs of cross sections 1203–1204 and 1205–1206 (FIG. 12), or the pairs of cross sections 1303–1304 and 1305–1306 (FIG. 13) are identical. Furthermore, in FIGS. 14 and 15, the switchable 90° optical rotation element 618 is disposed so as to rotate by 90° the light polarization planes of signals disposed to the right side of the appropriate cross sections. The effects of these rotations are seen by comparison of the pairs of cross sections 1403–1404 and 1405–1406 (FIG. 14), or the pairs of cross sections 1503–1504 and 1505–1506 (FIG. 15). It is also to be kept in mind that, in FIG. 13 and FIG. 15, the polarization planes of even-channel signals are rotated by 90° between cross section 1304 and cross section 1305 (FIG. 13) and also between cross section 1504 and 1505 (FIG. 15). The effect of each such rotation of signal light polarization is propagated along the remainder of the optical path until the signal is outputted from the channel separator 1100 through one of its four input and output ports.

Figure 16A:
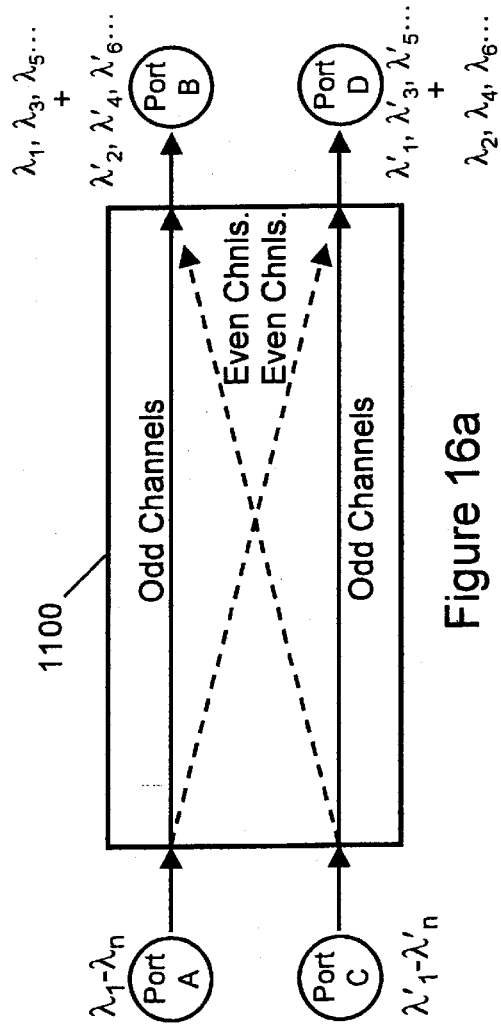
FIGS. 16a and 16b illustrate two operational states of the switchable optical channel separator in accordance with the present invention.
Figure 16B:
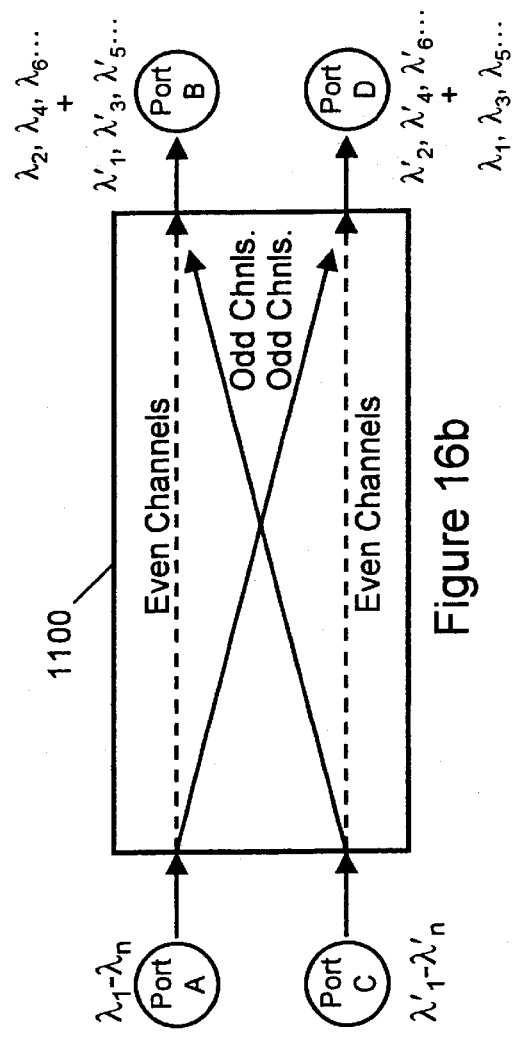

FIGS. 16a and 16b respectively depict the two operational states of the switchable optical channel separator 1100 in accordance the present invention. In the first such operational state illustrated in FIG. 16a, a first set of wavelengths consonant with a first set of interleaved channels are routed from Port A to Port B and from Port C to Port D and a second set of wavelengths consonant with a second set of interleaved channels are routed from Port A to Port D and from Port C to Port B. For convenience, the first and second sets of interleaved channels are herein termed "odd" and "even" channels, respectively.

For instance, if a set of n wavelength-division multiplexed channels denoted by $\lambda_1, \lambda_2, \lambda_3, \ldots, \lambda_n$ are input to Port A of the switchable optical channel separator 1100 in its first operational state, then the first or "odd" channels $\lambda_1, \lambda_3, \lambda_5, \ldots$ are routed to Port B and the second or "even" channels $\lambda_2, \lambda_4, \lambda_6, \ldots$ are routed to Port D. Similarly, if a second set of n wavelength-division multiplexed channels denoted by $\lambda'_1, \lambda'_2, \lambda'_3, \ldots, \lambda'_n$ are input to Port C of the switchable optical channel separator 1100 in the same first operational state, then the first or "odd" channels $\lambda'_1, \lambda'_3, \lambda'_5, \ldots$ are routed to Port D and the second or "even" channels $\lambda'_2, \lambda'_4, \lambda'_6, \ldots$ are routed to Port B. Thus, with the switchable optical channel separator 1100 in its first operational state, the output at Port B comprises the odd channels $\lambda_1, \lambda_3, \lambda_5, \ldots$ originally from Port A multiplexed together with the even channels $\lambda'_2, \lambda'_4, \lambda'_6, \ldots$ originally from Port C, and the output at Port D comprises the odd channels $\lambda'_1, \lambda'_3, \lambda'_5, \ldots$ originally from Port C multiplexed together with the even channels $\lambda_2, \lambda_4, \lambda_6, \ldots$ originally from Port A. The channel separator operates similarly in the reverse direction—that is, when Ports B and D are utilized for input and Ports A and C are utilized for output. In other words, the path of each and every channel is reversible.

In FIG. 16b, the switchable optical channel separator 1100 is illustrated in its second operational state. In this state, the output at Port B comprises the even channels $\lambda_2, \lambda_4, \lambda_6, \ldots$ originally from Port A multiplexed together with the odd channels $\lambda'_1, \lambda'_3, \lambda'_5, \ldots$ originally from Port C, and the output at Port D comprises the even channels $\lambda'_2, \lambda'_4, \lambda'_6, \ldots$ originally from Port C multiplexed together with the odd channels $\lambda_1, \lambda_3, \lambda_5, \ldots$ originally from Port A. The channel separator operates similarly in the reverse direction.

The operational state of switchable optical channel separator 1100 is controlled by the state of the switchable 90° optical rotation element 618. When switchable 90° optical rotation element 618 is in its "on" state such that there is effected a 90° rotation of the polarization plane of plane polarized light passing therethrough or there-past, then the switchable optical channel separator 1100 is in its second state. However, when switchable 90° optical rotation element 618 is in its "off" state such that there is no polarization plane rotation of plane polarized light passing therethrough or there-past, then the switchable optical channel separator 1100 is in its first state. When the switchable 90° optical rotation element 618 comprises the half-wave plate of a differential phase retardance switch 180 of the present invention, then the channel separator 1100 can be switched between its two routing states in approximately one millisecond.

Figure 17:
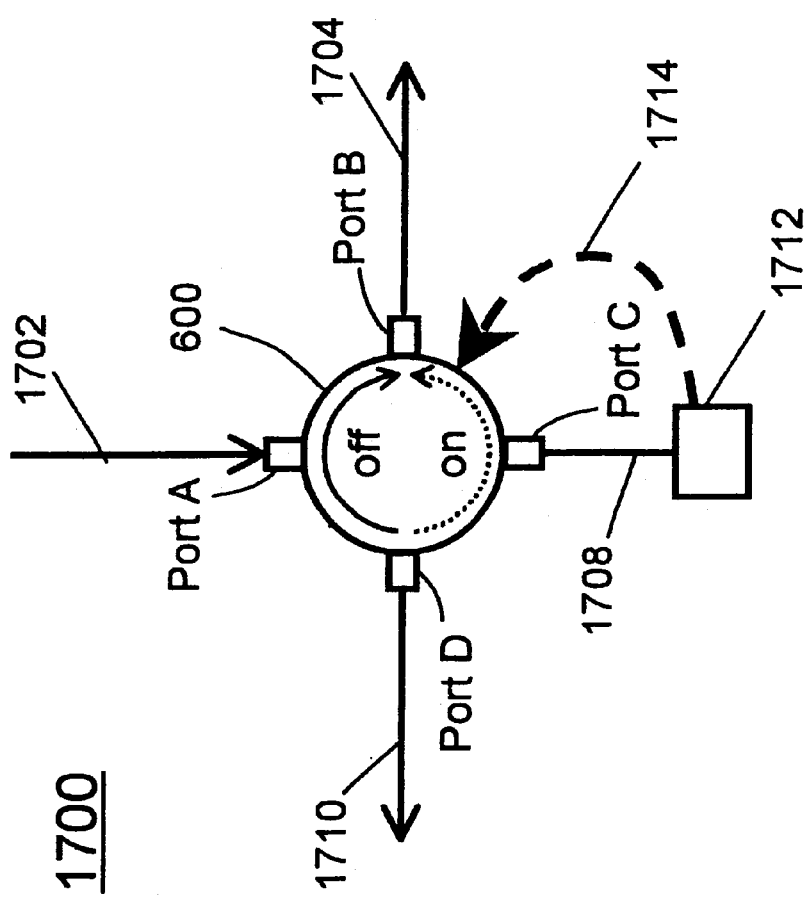
FIG. 17 is an illustration of a preferred embodiment of a self-switching optical line restoration switch in accordance with the present invention.

FIG. 17 is an illustration of a preferred embodiment of a self-switching optical line restoration switch 1700 in accordance with the present invention. The switch 1700 utilizes a reversible optical circulator 600 of the present invention. The reversible optical circulator 600 is optically coupled to an input telecommunications line 1702, an output telecommunications line 1704, an auxiliary telecommunications line 1710, and a detector link 1708 through its Port A, Port B, Port D and Port C, respectively. The detector link is optically coupled to a photo-detector 1712 at its end opposite reversible circulator 600. The photo-detector 1712 is electrically coupled to the switchable 90° optical rotation element 618 component (not shown) of reversible circulator 600 through an electrical or electronic link 1714. In normal operation, the reversible circulator 600 of self-switching optical line restoration switch 1700 is in its "off" position, and thus signals input to Port A from input line 1702 are directed in the "clockwise" circulation direction to Port B and thence to output line 1704. In this situation, the auxiliary telecommunications line 1702 remains unused and no optical signal is directed to the photo-detector 1712.

If there should be a line break within output telecommunications line 1704 and there is no optical isolator between the device 1700 and the line break, then signals will be reflected at the break point and will propagate backwards through line 1704 back to reversible circulator 600. These reflected signals and/or other lights will then be input to reversible circulator 600 through its Port B. Since the reversible circulator 600 will be in its "off" state immediately after such a line break occurs, these reflected signals and/or other lights will be directed in a "clockwise" circulation direction so as to be output from Port C to link 1708 and thence to photo-detector 1712. When photo-detector 1712 senses the presence of the reflected signals or other lights, it sends an electrical or electronic signal, via line 1714, which is sufficient to switch the switchable 90° optical rotation element 618 to its "on" state, thereby transforming reversible circulator 600 into its "on" state. Once this switching has occurred, signals or other lights inputted to Port A from input line 1702 will be directed in a "counter-clockwise" circulatory direction to Port D and thence to auxiliary telecommunications line 1710. In this fashion, the self-switching optical line restoration switch 1700 automatically switches signals and/or other lights away from the broken primary output line 1704 and into the auxiliary line 1710.

Figure 18:
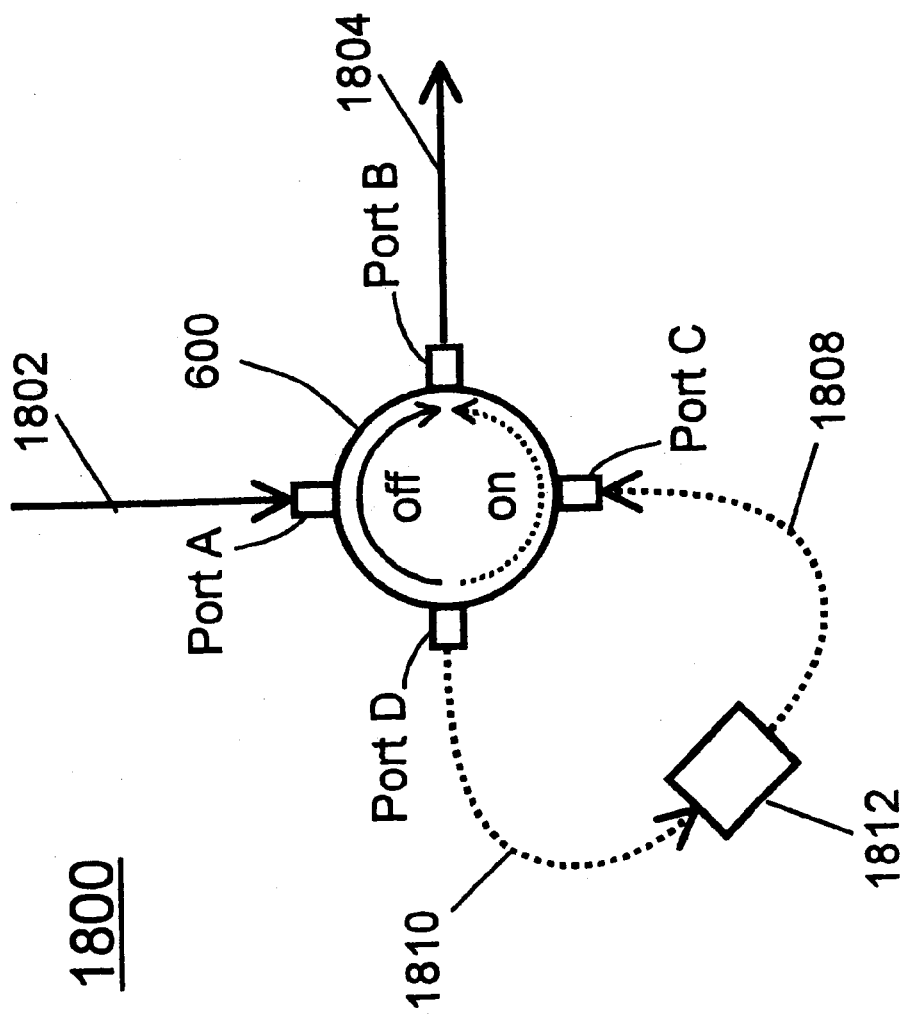
FIG. 18 is an illustration of a preferred embodiment of an optical bypass switch in accordance with the present invention.

FIG. 18 is an illustration of a preferred embodiment of an optical cut-in or bypass switch 1800 in accordance with the present invention. The cut-in or bypass switch 1800 is suitable for automated insertion or removal of a network component 1812 into or out of a telecommunications line. The switch 1800 comprises a reversible optical circulator 600 in accordance with the present invention respectively optically coupled to an input telecommunications line 1802 through its Port A, to an output telecommunications line 1804 through its Port B, and to a first 1808 and a second 1810 optical link through its Port C and Port D. The optical links 1808–1810 are each optically coupled to the network component 1812. The network component 1812 may comprise any one or a combination of a variety of optical or electro-optical components such as optical filters, optical attenuators, optical amplifiers, optical add/drops, dispersion compensators, transponders, wavelength shifters, etc.

In a first or "off" state, the reversible circulator 600 of switch 1800 receives optical signal input from input line 1802 through its port A and re-directs this signal in a "clockwise" circulatory direction so as to be output from Port B to output line 1804. In this state of operation, signals completely bypass the component 1812. In a second state of operation, the reversible circulator 600 is placed in its "on" state such that signals input at Port A are re-directed in a "counter-clockwise" circulatory direction to Port D and thence to the second optical link 1810 and network component 1812. The network component 1812 performs one or more of signal conditioning, signal addition or signal deletion operations upon the signal or signals received from the second link 1810 and then outputs the conditioned, modified or substituted signals to the first optical link 1808. The signal(s) output from component 1812 to the first link 1808 need not be the same signal or signals received by component 1812 from the second link 1810. The signals received by the first optical link 1808 from component 1812 are then delivered to Port C of the reversible circulator 600 from which they are directed to Port B and subsequently output to the output line 1804. In this fashion, the network component can be automatically switched in or out of an optical transmission within a millisecond as changing needs require.

Although the present invention has been described with an optical switching device utilizing a bi-morphic piezoelectric material, one of ordinary skill in the art will understand that other suitable materials may be used without departing from the spirit and scope of the present invention.

A method and apparatus for optical switching devices utilizing a bi-morphic piezoelectric electro-mechanical deflection and latching apparatus has been disclosed. The optical switching devices include a 1×2 optical switch utilizing a single electro-mechanical apparatus, various 1×N optical switches utilizing a plurality of electro-mechanical apparatus in a cascade arrangement, a reversible optical circulator, and a switchable optical channel separator. The optical devices in accordance with the present invention posseses the advantages of stable and reproducible operation, high switching speeds relative to other mechanical devices and low sensitivity to slight optical misalignments or vibrations. The optical devices in accordance with the present invention are of a compact modular design that allows the construction of more complex optical devices through utilization of a cascading arrangement, where an optical beam or signal can be deflected about axes in more than one spatial dimension.

Although the present invention has been described in accordance with the embodiments shown, one of ordinary skill in the art will readily recognize that there could be variations to the embodiments and those variations would be within the spirit and scope of the present invention. Accordingly, many modifications may be made by one of ordinary skill in the art without departing from the spirit and scope of the appended claims.

What is claimed is:

1. A reversible optical circulator, comprising:

a first port;

a second port; and a third port, wherein in a first state, light input from the first port is output to the second port and light input from the second port is output to the third port, wherein in a second state, light input from the third port is output to the second port and light input from the second port is output to the first port, wherein the first state is switchable to the second state utilizing an optical switch comprising:

an arm comprising a piezoelectric material, the arm comprising a first and a second face and a first and a second end, wherein the first face is opposite to the second face, wherein the first end is opposite to the second end, at least one electrode coupled to the arm for providing a voltage difference between the first and second faces of the arm, a support coupled to the first end of the arm for fixedly supporting the first end, an object with a convex surface coupled to the second end of the arm, a polarization rotation element coupled to the second face of the arm, a first magnet proximately located to the object and to the first face of the arm, and a second magnet proximately located to the object and to the second face of the arm.

2. The circulator of claim 1, wherein the arm comprises:

a first piezoelectric plate; and a second piezoelectric plate coupled to the first piezoelectric plate in parallel.

3. The circulator of claim 2, wherein the at least one electrode comprises:

a first electrode located between the first and the second piezoelectric plates;

a second electrode coupled to the first piezoelectric plate at a side opposite to the first electrode; and a third electrode coupled to the second piezoelectric plate at a side opposite to the first electrode.

4. The circulator of claim 1, wherein the support comprises:
   a first support member coupled to the first end and the first face of the arm; and
   a second support member coupled to the first end and the second face of the arm.

5. The circulator of claim 1, wherein the object comprises:
   a first hemisphere coupled to the second end and the first face of the arm; and
   a second hemisphere coupled to the second end and the second face of the arm.

6. An optical circulator, comprising:
   a first birefringent plate for receiving at least one signal light ray from a first port, wherein the first birefringent plate separates the at least one signal light ray into a plurality of sub-signal rays;
   a second birefringent plate optically coupled to the first birefringent plate;
   at least one optical rotator optically coupled between the first and second birefringent plates, wherein the at least one optical rotator intercepts a portion of the plurality of sub-signal rays;
   at least one reciprocal optical rotator and at least one non-reciprocal optical rotator optically coupled to the second birefringent plate at a side opposite to the at least one optical rotator;
   an optical switch optically coupled to the at least one non-reciprocal optical rotator or the at least one reciprocal optical rotator at a side opposite to the second birefringent plate;
   a lens optically coupled to the at least one reciprocal optical rotator or the at least one non-reciprocal optical rotator, and the optical switch at a side opposite to the second birefringent plate; and
   a mirror optically coupled to the lens at a side opposite to the optical switch,
   wherein the mirror reflects the plurality of sub-signal rays such that the plurality of sub-signal rays is folded back upon itself,
   wherein the at least one reciprocal optical rotator, the optical switch, the at least one non-reciprocal optical rotator, the at least one optical rotator, and the first and second birefringent plates recombine the reflected plurality of sub-signal rays into the at least one signal light ray, such that the recombined at least one signal light ray is directed to a second port.

7. The circulator of claim 6, wherein the optical switch comprises:
   an arm comprising a piezoelectric material, the arm comprising a first and a second face and a first and a second end, wherein the first face is opposite to the second face, wherein the first end is opposite to the second end;
   at least one electrode coupled to the arm for providing a voltage difference between the first and second faces of the arm;
   a support coupled to the first end of the arm for fixedly supporting the first end;
   an object with a convex surface coupled to the second end of the arm;
   an optical element coupled to the second face of the arm capable of deflecting an optical signal traveling therethrough;
   a first magnet proximately located to the object and to the first face of the arm; and
   a second magnet proximately located to the object and to the second face of the arm.

8. The circulator of claim 7, wherein the arm comprises:
   a first piezoelectric plate; and
   a second piezoelectric plate coupled to the first piezoelectric plate in parallel.

9. The circulator of claim 8, wherein the at least one electrode comprises:
   a first electrode located between the first and the second piezoelectric plates;
   a second electrode coupled to the first piezoelectric plate at a side opposite to the first electrode; and
   a third electrode coupled to the second piezoelectric plate at a side opposite to the first electrode.

10. The circulator of claim 7, wherein the support comprises:
    a first support member coupled to the first end and the first face of the arm; and
    a second support member coupled to the first end and the second face of the arm.

11. The circulator of claim 7, wherein the object comprises:
    a first hemisphere coupled to the second end and the first face of the arm; and
    a second hemisphere coupled to the second end and the second face of the arm.

12. The circulator of claim 7, wherein the optical element comprises a switchable 90 degree optical rotation element.

13. A system for directing a signal light ray, comprising:
    an optical network, the optical network comprising the signal light ray; and
    an optical circulator, comprising:
        a first birefringent plate for receiving at least one signal light ray from a first port, wherein the first birefringent plate separates the at least one signal light ray into a plurality of sub-signal rays;
        a second birefringent plate optically coupled to the first birefringent plate;
        at least one optical rotator optically coupled between the first and second birefringent plates, wherein the at least one optical rotator intercepts a portion of the plurality of sub-signal rays;
        at least one reciprocal optical rotator and at least one non-reciprocal optical rotator optically coupled to the second birefringent plate at a side opposite to the at least one optical rotator;
        an optical switch optically coupled to either the at least one non-reciprocal optical rotator or the at least one non-reciprocal optical rotator at a side opposite to the second birefringent plate;
        a lens optically coupled to the at least one reciprocal optical rotator or the non-reciprocal optical rotator, and the optical switch at a side opposite to the second birefringent plate; and
        a mirror optically coupled to the lens at a side opposite to the optical switch,
        wherein the mirror reflects the plurality of sub-signal rays such that the plurality of sub-signal rays is folded back upon itself,
        wherein the at least one reciprocal optical rotator, the optical switch, the at least one non-reciprocal optical rotator, the at least one optical rotator, and the first and second birefringent plates recombine the reflected plurality of sub-signal rays into the at least one signal light ray, such that the recombined at least one signal light ray is directed to a second port.

14. The system of claim 13, wherein the optical switch comprises:
   an arm comprising a piezoelectric material, the arm comprising a first and a second face and a first and a second end, wherein the first face is opposite to the second face, wherein the first end is opposite to the second end;
   at least one electrode coupled to the arm for providing a voltage difference between the first and second faces of the arm;
   a support coupled to the first end of the arm for fixedly supporting the first end;
   an object with a convex surface coupled to the second end of the arm;
   an optical element coupled to the second face of the arm capable of deflecting an optical signal traveling therethrough;
   a first magnet proximately located to the object and to the first face of the arm; and
   a second magnet proximately located to the object and to the second face of the arm.

15. A method for directing a signal light ray, comprising the steps of:
   (a) separating the signal light ray into a plurality of sub-signal rays, wherein the signal light ray is inputted from a first port;
   (b) rotating a polarization direction of a portion of the plurality of sub-signal rays utilizing an optical switch comprising a switchable 90 degree rotation element, wherein the utilizing an optical switch comprising a switchable 90 degree rotation element, wherein the optical switch comprises:
   an arm comprising a piezoelectric material, the arm comprising a first and a second face and a first and a second end, wherein the first face is opposite to the second face, wherein the first end is opposite to the second end,
   at least one electrode coupled to the arm for providing a voltage difference between the first and second faces of the arm,
   a support coupled to the first end of the arm for fixedly supporting the first end,
   an object with a convex surface coupled to the second end of the arm,
   an optical element coupled to the second face of the arm capable of deflecting an optical signal traveling therethrough,
   a first magnet proximately located to the object and to the first face of the arm, and
   a second magnet proximately located to the object and to the second face of the arm;
   (c) reflecting the rotated portion and a remainder of the plurality of sub-signal rays, such that the rotated portion and the remainder are folded back upon themselves; and
   (d) combining the rotated portion and the remainder of the plurality of sub-signal rays into the signal light ray, wherein the signal light ray is outputted to a second port.

* * * * *